(12) United States Patent
Gilor

(10) Patent No.: US 7,570,301 B2
(45) Date of Patent: Aug. 4, 2009

(54) DEVICE, SYSTEM AND METHOD OF MOUNTING AUDIO/VIDEO CAPTURING EQUIPMENT

(75) Inventor: Avraham Gilor, New York, NY (US)

(73) Assignee: Electronic Security Products, Inc., New York, NY (US)

(*) Notice: Subject to any disclaimer, the term of this patent is extended or adjusted under 35 U.S.C. 154(b) by 605 days.

(21) Appl. No.: 11/282,710

(22) Filed: Nov. 21, 2005

(65) Prior Publication Data

US 2006/0072007 A1    Apr. 6, 2006

Related U.S. Application Data

(63) Continuation-in-part of application No. 10/971,055, filed on Oct. 25, 2004.

(60) Provisional application No. 60/576,312, filed on Jun. 3, 2004.

(51) Int. Cl.
*H04N 5/225* (2006.01)
*G03B 17/00* (2006.01)

(52) U.S. Cl. ..................... 348/373; 396/428

(58) Field of Classification Search ......... 348/373–376; 396/419–428
See application file for complete search history.

(56) References Cited

U.S. PATENT DOCUMENTS

| 5,815,126 A | 9/1998 | Fan et al. |
| 6,456,261 B1 | 9/2002 | Zhang |
| 6,849,849 B1 | 2/2005 | Warner et al. |
| 2002/0120979 A1* | 9/2002 | Prendergast .................... 2/422 |
| 2003/0025828 A1* | 2/2003 | Ramonowski et al. ...... 348/376 |
| 2005/0271355 A1 | 12/2005 | Gilor |

FOREIGN PATENT DOCUMENTS

| DE | 94 03 062 | 6/1994 |
| GB | 2251780 | 7/1992 |
| JP | 2000-115596 | 4/2000 |
| WO | WO 2004/068212 | 8/2004 |

OTHER PUBLICATIONS

European Search Report for European patent application No. EP 06 10 0151, mailed on Oct. 11, 2006.

* cited by examiner

*Primary Examiner*—Timothy J Henn
(74) *Attorney, Agent, or Firm*—Pearl Cohen Zedek Latzer, LLP

(57) ABSTRACT

Some embodiments of the invention include devices, systems and methods of mounting audio/video capturing equipment. For example, a mounting device for mounting equipment onto a helmet includes: a support structure having one or more gripping mechanisms adapted to be fitted to one or more locations of the helmet; and a camera mount, at a first location of the support structure, to support a camera at a desired image-capturing position.

19 Claims, 22 Drawing Sheets

DEVICE, SYSTEM AND METHOD OF MOUNTING AUDIO/VIDEO CAPTURING EQUIPMENT

CROSS-REFERENCE TO RELATED APPLICATIONS

This application is a continuation-in-part of, and claims benefit and priority of, U.S. patent application No. 10/971,055, filed on Oct. 25, 2004, entitled "Device, System and Method of Digitally Recording Audio/Video", which in turn claims benefit and priority of U.S. Provisional Patent Application No. 60/576,312, filed on 3 Jun. 2004, entitled "device, System and Method of Digitally Recording Audio/Video", both of which are hereby incorporated by reference in their entirety.

FIELD OF THE INVENTION

The invention relates generally to the field of cameras and recorders, and more specifically, to systems for capturing and recording audio/video.

BACKGROUND OF THE INVENTION

An audio/video camera may capture audio and/or video. A separate storage device may be used to store data corresponding to the audio and/or video captured by the camera.

The camera and the storage device may be used for surveillance indoors, for example, by placing the camera and the storage device on a table or on a shelf.

Unfortunately, it may be inconvenient, conspicuous and/or difficult to use the camera and the storage device outdoors, for example, by a user that engages in activity that requires movement, combat operations, security tasks, sports, with limited or no space for carrying accessory devices, while riding a motorcycle or a horse, or the like.

SUMMARY OF THE INVENTION

Some embodiments of the invention include devices, systems and methods of mounting audio/video capturing equipment.

Some embodiments of the invention provide a mounting device for mounting audio/video equipment to a helmet. The mounting device may, for example, be adapted to be fitted over the helmet. The mounting device may include, for example, a support structure adapted for mounting onto one or more desired locations on a helmet, e.g., using suitable grips.

The mounting device may include a camera mount, at a first location on the support structure, to support or accommodate a camera, and optionally a microphone, at a desired position vis-a-vis the helmet onto which the mounting device is mounted.

The mounting device may further include a recorder mount, at a second location on the support structure, to support or accommodate a recorder. The recorder may be operatively connected to the camera, and may store images and/or video captured by the camera, and/or audio captured by the microphone.

The mounting device may optionally include one or more linking elements, to attach the camera mount to the recorder mount. One or more linking elements may be added or removed from the support structure, e.g., to increase or decrease the size of the mounting device, or to allow the mounting device to fit a curve, shape or size of a specific helmet.

The camera may be connected to the recorder using one or more wired links, which may pass through a hollow shaft within the linking element(s). The wired link(s) may, for example, transfer audio data and/or video data from the camera and/or the microphone to the recorder. Optionally, the wired link(s) may further transfer power to the camera from a power source, e.g., an internal power source of the recorder, or a separate power source attached to the mounting device and able to provide power to the recorder and/or the camera.

The camera mount may optionally be supported by an orientation mechanism, allowing a user to modify an orientation of the camera e.g., by sliding or gliding the camera mount over a base rail, by locking or fixing the camera mount to a specific location on the base rail, or the like.

One or more grips, for connecting the support structure to the helmet, may be included in the mounting device. The grip(s) may include, for example, adjustable-length grip(s) that enable fitting of the mounting device to variable types and sizes of helmets.

In some embodiments, the mounting device may include one or more front grips and/or one or more back grips. The grips may be, for example, hook-shaped. The relative position of the grips and/or hooks, and/or the length of the grips, may be adjusted or modified, for example, using one or more adjustable front rails and one or adjustable back rails. For example, the front grips may be fitted to a front portion of the helmet, e.g., at the edge of an external, rigid layer of the helmet structure; whereas the back grips may be fitted to, e.g., an edge, of a back portion of the helmet.

In some embodiments, one or more grips, e.g., front grips and/or back grips, may include an adjustable-length grip mechanism, a fixed-length grip mechanism, a single-direction length-shortening grip mechanism, or other suitable gripping mechanism.

Some embodiments of the invention may allow, for example, easy and/or quick mounting of a camera and/or a recorder onto a helmet.

Embodiments of the invention may provide various other benefits or advantages.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
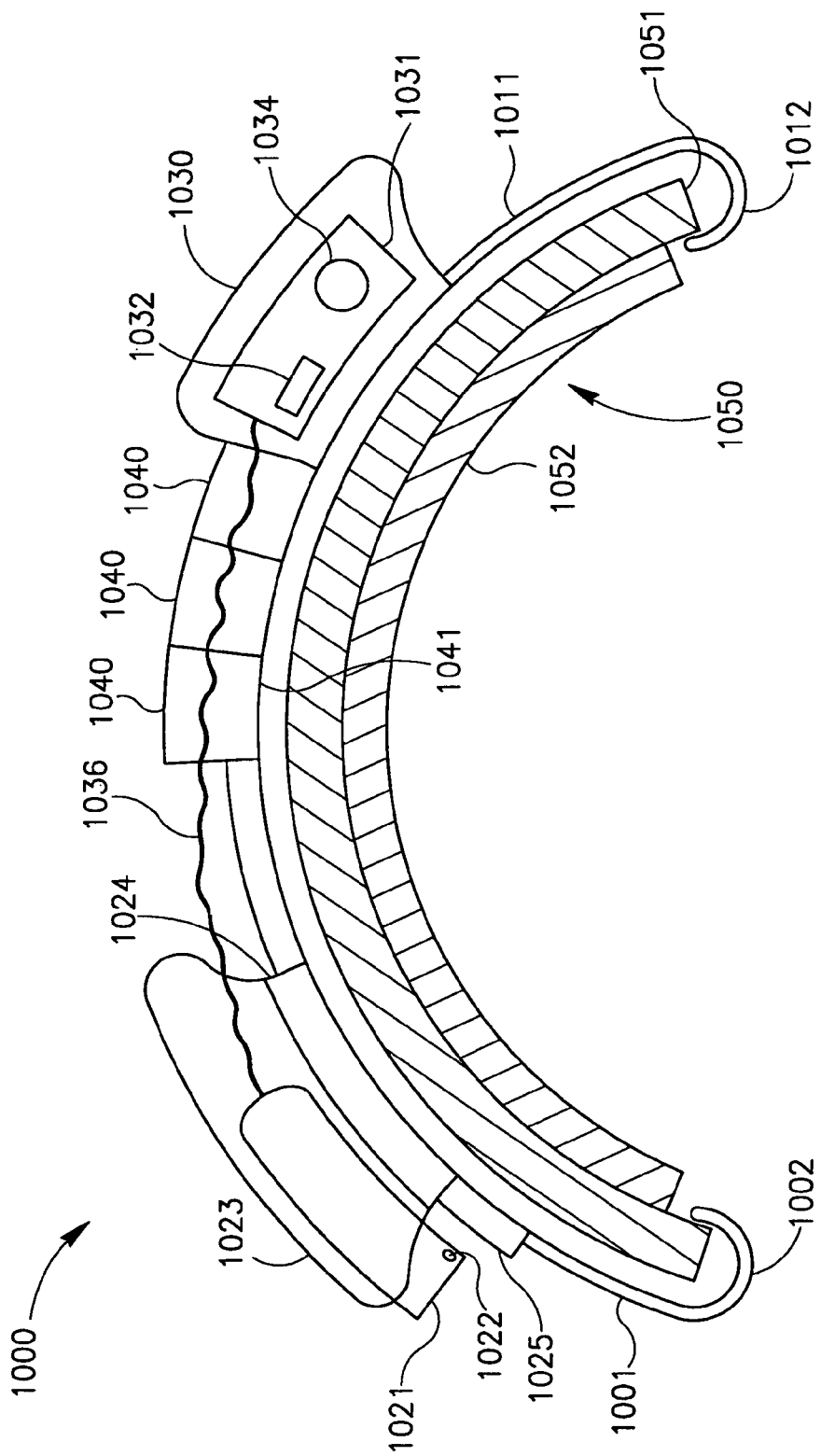
FIG. 1 is a schematic, cross-sectional illustration of a mounting device attached to a helmet and having mounted thereon a camera and a recorder, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Reference is made to FIG. 1, which schematically illustrates a cross-section of mounting device 1000 in accordance with an embodiment of the invention, the mounting device 1000 attached to a helmet 1050. Mounting device 1000 may, for example, be adapted to fit over, or attach or connect to, helmet 1050.

Mounting device 1000 may include, for example, a camera mount 1023 able to support or accommodate a camera 1021 and optionally a microphone 1022; one or more linking elements 1040; and a recorder mount 1030 able to support or accommodate a recorder 1031. Camera 1021 may be connected to recorder 1031 using one or more wired links 1036, which may pass through a hollow shaft within linking element(s) 1040. Wired link(s) 1036 may, for example, transfer audio data and/or video data from camera 1021 and/or microphone 1022 to recorder 1031; and/or may transfer power from a power source 1032 of recorder 1031 to camera 1021.

Camera mount 1023 may optionally be supported by an orientation mechanism 1024 allowing a user to modify an orientation or angular direction of camera 1021, e.g., by sliding or gliding the camera mount 1023 over a base rail 1025.

Recorder 1031 may optionally include a button 1034, e.g., having a diameter of at least 15 millimeters, of approximately 20 millimeters, of approximately 25 millimeters, or the like. By pressing button 1034, a user may activate or deactivate recorder 1031, may input operational instructions to recorder 1031, or may otherwise modify an operational parameter or operational mode of recorder 1031.

Mounting device 1000 may be connected to a front side of helmet 1050 using one or more adjustable-length front rails 1001 having one or more front hooks 1002. For example, front hook(s) 1002 may attach to a portion of helmet 1050 between an external, rigid, layer 1051 of helmet 1050 and an internal, soft or flexible, layer 1052 of helmet 1052.

Mounting device 1000 may further be connected to a back side of helmet 1050 using one or more back rails 1011 having one or more back hooks 1012. For example, back hook(s) 1012 may attach to a portion of helmet 1050 between an external, rigid, layer 1051 of helmet 1050 and an internal, soft or flexible, layer 1052 of helmet 1052.

Optionally, mounting device 1000 may include a support structure 1041 to interconnect one or more components of mounting device 1000, or to allow insertion and/or removal of one or more components of mounting device 1000. In one embodiment, support structure 1041 may be implemented using a dedicated curved rail, e.g., formed of metal or plastic, able to carry or support recorder mount 1030, linking elements 1040, orientation mechanism 1024 and/or camera mount 1023, and optionally connected to one or more gripping mechanisms. In another embodiment, a separate support structure 1041 need not be used; for example, linking elements 1040, when connected to recorder mount 1030 and to camera mount 1023 or to orientation mechanism 1024, may include the support functionality of support structure 1041.

Figure 2:
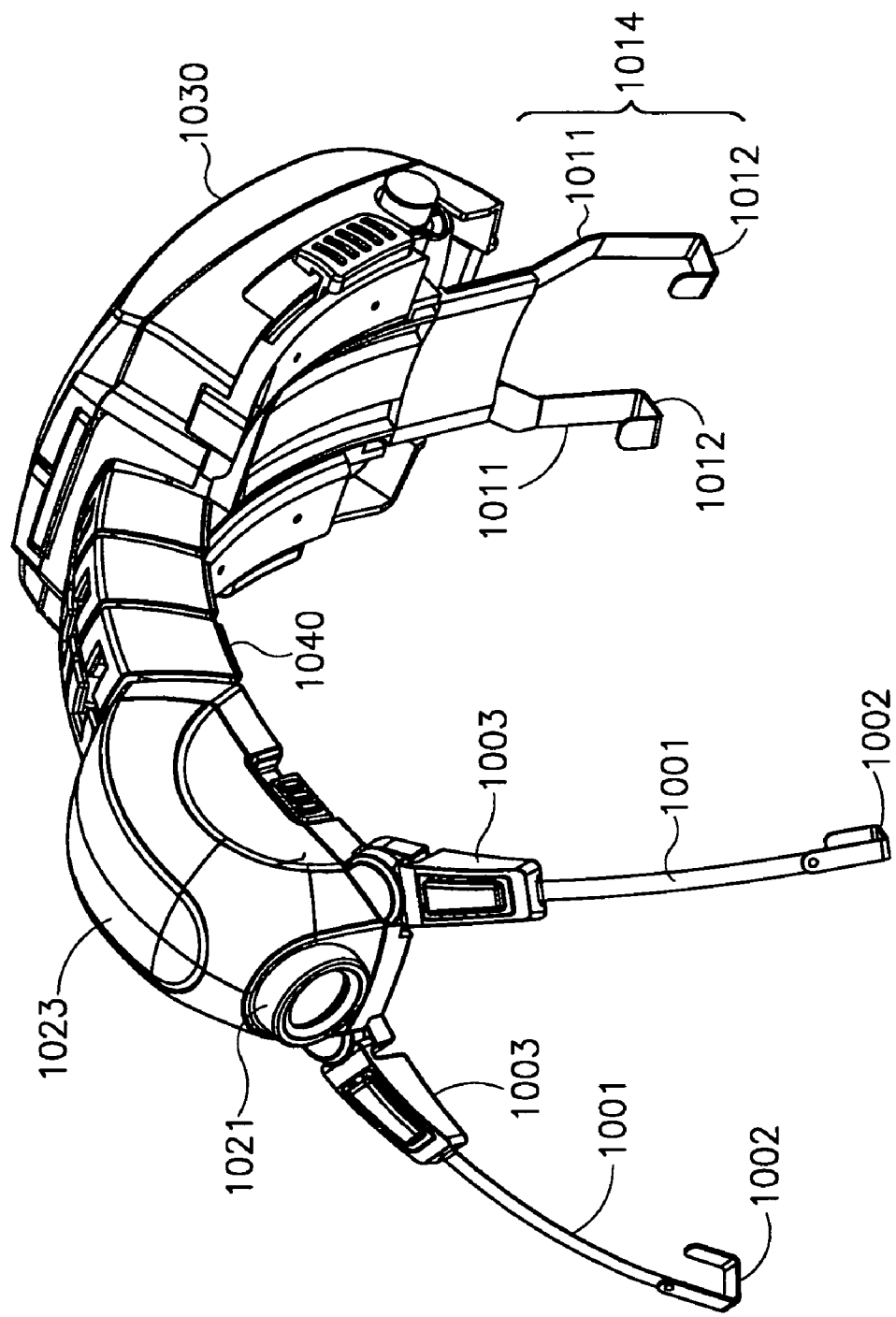
FIG. 2 is a schematic, isometric, pictorial illustration of a mounting device in accordance with an embodiment of the invention.

Reference is made to FIG. 2, which schematically illustrates the mounting device 1000 in accordance with an embodiment of the invention.

Mounting device 1000 may include, for example, camera mount 1023 able to hold, accommodate, support and/or contain camera 1021, e.g., a video camera, an audio/video camera, a stills camera, a "lipstick"-type camera, a "button"-type camera, a miniature camera, an imager, a CCD camera, a CMOS camera, or the like.

In some embodiments, camera 1021 may optionally include microphone 1022 able to capture audio. In other embodiments, microphone 1022 may be implemented as a sub-unit of mounting device 1000, as part of recorder 1031, as a separate unit attached to mounting device 1000, as part of another component of mounting device 1000, or the like.

Camera mount 1023 may include a housing or a cover formed of a relatively stiff or rigid material, e.g., plastic, PolyCarbonate (PC), metal, or the like. This may allow camera mount 1023 to protect camera 1021 from tampering, mechanical shocks, hard objects, external force(s), weather conditions, rain, snow, heat, wetness, water, or the like. For example, camera mount 1023 may enclose, contain or cover substantially all of camera 1021, e.g., allowing a lens or an input-receiving portion of camera 1021 to acquire images while protecting other portions of camera 1021.

Camera 1021 may be inserted into camera mount 1023, and/or may be connected and/or detachably attached to camera mount 1023, for example, using a connection mechanism, e.g., a socket connector, a pin connector, a male-female type connector, a plug connector, a screwing mechanism, a push-pull mechanism, a threading mechanism, by applying force or pressure, or the like. In some embodiments, camera 1021 may be detached from camera mount 1023 utilizing the connection mechanism, thereby allowing a user to replace or remove camera 1021, e.g., for maintenance, cleaning, repairs, replacement, or the like.

Camera mount 1023 may include, or may be connected to, an orientation mechanism 1024 allowing a user to modify the location, orientation, direction and/or position of camera 1021. For example, orientation mechanism 1024 may allow a user to modify an angle at which camera 1021 is positioned or oriented, to modify the field-of-view captured by camera 1021, to modify the location of camera mount 1023 and/or camera 1.021 relative to device 1000, or the like. In one embodiment, for example, orientation mechanism 1024 may include one or more base rails 1025, on which camera mount 1023 may glide, slide or move, e.g., back and forth upon application of pressure or force. A user may thus move the camera mount 1023 on the base rail 1025, and may fix or lock the position of camera mount 1023 at a specific place of the base rail 1025, for example, utilizing a fixing or locking mechanism, e.g., a screw or a pin.

Camera mount 1023 may include, for example, a lower side having a substantially curved shape, e.g., to fit a curve of helmet 1050; and/or an upper side having a substantially curved shape, e.g., to allow efficient aero-dynamic flow and/or to decrease aero-dynamic resistance of camera mount 1023.

Mounting device 1000 may further include, for example, a recorder mount 1030 able to hold, accommodate, support and/or contain one or more components. In some embodiments, for example, recorder mount 1030 may support or accommodate a recorder 1.030 able to receive and record data, e.g., video data and/or audio data captured by camera 1021 and/or microphone 1022. The audio/video data may be transferred from camera 1021 and/or microphone 1022 to receiver recorder 1030 using wired link 1036, e.g., a wire, a cable, a rail, a conducting element, or the like. Optionally, in other embodiments, camera 1021 may transfer video data to recorder 1031 using a wireless link.

In some embodiments, a power source 1032, e.g., a battery, a rechargeable battery, a power cell, or the like, may be included in recorder 1031, and may provide power to recorder 1031. Optionally, power source 1032 of recorder 1031 may further provide power to camera 1021 and/or microphone 1022, for example, using one or more wires or cables, e.g., wired link 1036. In one embodiment, power source 1032 may be internal to recorder 1031. In another embodiment, power source 1032 may be external to recorder 1031, e.g., implemented as part of recorder mount 1030 or as a separate unit of mounting device 1000. In some embodiments, a single power source 1032 may provide power to both recorder 1031 and camera 1021.

Recorder mount 1030 may include a housing or a cover formed of a relatively stiff or rigid material, e.g., plastic, PolyCarbonate (PC), metal, or the like. This may allow recorder mount 1030 to protect recorder 1031 and/or power source 1032 from tampering, mechanical shocks, hard objects, external force(s), weather conditions, rain, snow, heat, wetness, water, or the like. For example, recorder mount 1030 may enclose, contain or cover substantially all of recorder 1031, allowing an input socket of recorder 1031 to receive video data from wired link 1036 while protecting other portions of recorder 1031.

Recorder mount 1030 may include, for example, a lower side having a substantially curved shape, e.g., to fit a curve of helmet 1050; and/or an upper side having a substantially curved shape, e.g., to allow efficient aerodynamic flow and/or to decrease aero-dynamic resistance of recorder mount 1023.

Recorder 1031 may, for example, be inserted into recorder mount 1030, and/or may be connected and/or may be detachably attached to recorder mount 1030 using a connection mechanism, for example, a socket connector, a pin connector, a male-female type connector, a plug connector, a screwing mechanism, a push-pull mechanism, a threading mechanism, by applying force or pressure, or the like. In some embodiments, recorder 1031 may be detached from recorder mount 1030 utilizing the connection mechanism, thereby allowing a user to replace or remove recorder 1031, e.g., for maintenance, cleaning, repairs, replacement, data upload, data retrieval, audio/video playback, or the like.

Recorder 1031 may include, for example, a digital audio/video recorder having a miniature storage device, e.g., a miniature hard disk drive or a Flash-type memory unit. For example, recorder 1031 may be substantially identical or similar to recorder 200 described herein, may include one or more components of recorder 200 described herein, and/or may have one or more functionalities or features of recorder 200 described herein. Other suitable audio/video recorders may be used in conjunction with mounting device 1000.

In some embodiments, optionally, recorder mount 1030 and recorder 1031 may be pre-manufactured, pre-provided or implemented as a single unit. For example, the recorder mount 1030 may be used as a housing for the components of recorder 1031, thereby obviating the need for recorder 1031 to have a separate housing enclosing its component therein.

Camera mount 1023 may be attached or connected to recorder mount 1030, for example, using one or more linking elements 1040, e.g., interconnected to form a chain of linking elements 1040. One or more of the linking element(s) 1040 may be detachable or removable, e.g., to allow modular removal and/or addition of one or more linking elements 1040 from the chain, thereby allowing a user to modify, increase or decrease the total length (e.g., the chain) of linking elements 1040 and mounting device 1000. In some embodiments, the modular, removable and/or insert-able linking element(s) may allow, for example, adjustment of the distance between camera mount 1023 and recorder mount 1030; may allow configuration of the shape, contour, length, size, or curve of mounting device 1000; may allow adaptation of mounting device 1000, e.g., to fit or better fit the structure or curve of a specific helmet 1050; or the like.

In some embodiments, for example, camera mount 1023 may be detachably or non-detachably connected to a first linking element 1040; recorder mount 1030 may be detachably or non-detachably connected to a second linking element 1040; and one or more other linking elements 1040 may be inserted or removed, e.g., between the first and second linking elements 1040. The linking elements 1040 may be formed of, for example, a rigid material, a semi-rigid material, plastic, PolyCarbonate (PC), metal, rigid or semi-stiff rubber, or the like.

In some embodiments, camera 1021 may be connected to recorder 1031 using wired link 1036. Optionally, wired link 1036 may be implemented using a rail, a cable, a metal element, a conductive element, a communication cable, or the like. In one embodiment, for example, a first wired link 1036 may, for example, transfer audio/video data from camera 1021 to recorder 1031; and a second wired link 1036 may transfer power from power source 1032 and/or recorder 1031 to camera 1021.

Optionally, the one or more wired link(s) 1036 may be inserted to, or may pass within, a hollow portion or shaft of linking element(s) 1040, for example, utilizing a tunnel, a cavity or a shaft which may traverse linking element(s) 1040. In one embodiment, linking element(s) 1040 may have a "U"-shaped cross section forming a cavity, a tunnel or a shaft and the wired link(s) 1036 may be inserted therein, e.g., by pushing or inserting the wired link(s) 1036 through the open portion of the "U"-shaped cross section. Optionally, the length of wired link(s) 1035 may be adjusted to accommodate the distance between camera mount 1023 and recorder mount 1030, e.g., by folding, wrapping, looping, cutting, or otherwise decreasing or increasing the length of wired link(s) 1035.

In some embodiments, wired link(s) 1036 may be included or embedded within linking element(s) 1040, for example, as integral part of linking element(s) 1040, as a metal or conductive rail which may support linking element(s) 1040, as a cable or wire which may be attached to linking element(s) 1040, using conductive linking element(s) 1040, using linking element(s) having conductive portions, or the like.

Linking element(s) 1040 may include, for example, a lower side having a substantially curved shape, e.g., to fit a curve of helmet 1050; and/or an upper side having a substantially curved shape, e.g., to allow efficient aerodynamic flow and/or to decrease aero-dynamic resistance of recorder mount 1023.

In some embodiments, the modularity of camera mount 1023, recorder mount 1030 and/or linking element(s) 1040 may allow a user to utilize various angular positions of these components relative to each other. This may further allow, for example, the mounting device 1000 to be adapted to a specific curved shape, e.g., to fit a specific helmet 1050.

A first side, e.g., a front side, of mounting device 1000 may include an adjustable grip 1004, for example, having a modifiable length. Grip 1004 may include, for example, a rail housing 1003 having therein one or more adjustable rails 1001. The adjustable rails 1001 may include, or may end with, one or more hooks 1002. The rail housing 1003 may include a mechanism to adjust, retract, pull out, lock and/or fix the portion of rail(s) 1001 which protrudes out of rail housing 1003. In some embodiments, for example, a screw, a screwing mechanism or a threading mechanism may be used for such adjustment and/or locking of rail 1001. The length of rail(s) 1001 may be adjusted and/or fixed, for example, such that hook(s) 1002 of rail(s) 1001 may grip, or attach to, a side of helmet 1050, e.g., an internal layer 1050 of helmet 1050, a layer of foam or cloth within helmet 1050, an external layer 1051 of helmet 1050, or the like.

A second side, e.g., a back side or a substantially opposite side, of mounting device 1000 may include an adjustable or non-adjustable grip 1014. In one embodiment, grip 1014 may include an adjustable mechanism similar to grip 1004, rail housing 1003, rail(s) 1001 and/or hooks 1002. In another embodiment, grip 1014 may optionally include a loop, a locking mechanism, a single-directional shortening mechanism, a tying mechanism, or the like, allowing grip 1014 to be attached to helmet 1050, e.g., to layer 1051 or layer 1052 of helmet 1050. In one embodiment, a one-way tying or locking mechanism may be used, for example, such that the size or length of grip 1014 may be incrementally decreased, but may not be increased. In some embodiments, grip 1014 may include one or more rail(s) 1011 and/or hook(s) 1012, such that grip 1014 may grip a side of helmet 1050, e.g., an internal layer 1052 of helmet 1050, a layer of foam or cloth within a helmet, an external layer 1051 of helmet 1050, or the like.

Grips 1014 and/or 1004 may include other suitable stretching mechanisms, e.g., allowing a user to stretch the length of mounting device 1000, such that grip 1004 may attach to a first side or edge of helmet 1050 and grip 1014 may attach to a second, substantially opposite, side or edge of helmet 1050.

Grip 1004 and/or grip 1014 may include, for example, a lower side having a substantially curved shape, e.g., to fit a curve of helmet 1050; and/or an upper side having a substantially curved shape, e.g., to allow efficient aero-dynamic flow and/or to decrease aerodynamic resistance of recorder mount 1023. In some embodiments, grip 1004 and/or grip 1014 may be relatively thin, for example, may have a thickness of approximately one or two millimeters. In some embodiments, grip 1004 and/or grip 1014 may be formed of, or may include, flexible or semi-flexible portions, e.g., formed of rubber, semi-rigid rubber, flexible metal, or the like.

In some embodiments, a user may relatively easily and/or quickly mount the mounting device 1000 on helmet 1050. For example, grip 1014 may be attached to a back side of the helmet 1050, e.g., using hook(s) 1012 or by otherwise tying the rail(s) 1011 to an internal foam layer 1052 of helmet 1050. The length of rail 1001 may be modified or adjusted, e.g., increased or decreased, such that hook(s) 1002 may connect to a front side of helmet 1050, for example, to an internal foam layer 1052 of helmet 1050. Optionally, one or more linking element(s) 1040 may be removed or added, for example, prior to mounting the device 1000 on the helmet 1050, to fit the size or the shape of the specific helmet 1050. Camera 1021 may be inserted or otherwise connected to camera mount 1023. Recorder 1031 may be inserted into recorder mount 1030. Wired link 1036 may be connected between camera 1021 and recorder 1030, optionally through a hollow shaft within linking element(s) 1036. The orientation or position of camera 1021 may be adjusted, for example, using orientation mechanism 1024. Recorder 1031 may be activated or deactivated using the button 1034, may receive and record audio/video data captured by camera 1021 and/or microphone 1022, and may provide power from power source 1032 to camera 1021.

Components of mounting device 1000 may be connected, configured or arranged utilizing other suitable configurations or mechanisms. In one embodiment, for example, camera mount 1023 may be connected to linking element(s) 1040, which may be connected to recorder mount 1030. In another embodiment, for example, camera mount 1023 may be connected substantially directly to, or may be in proximity to, recorder mount 1030, and linking element(s) 1040 may be connected behind recorder mount 1030 and/or in front of camera mount 1023. In yet another embodiment, mounting device 1000 may be configured or attached such that camera 1021 may point backwards, upwards, sideways, at a horizontal angle, at a vertical angle, substantially horizontally, substantially vertically, or the like. Other suitable configurations may be used.

In some embodiments, optionally, camera mount 1023 and recorder mount 1030 may be implemented as a single or integrated unit of mounting device 1000.

Optionally, recorder 1031 may include one or more buttons to control the operation of recorder 1031. For example, in some embodiments, recorder 1031 may include a single button, e.g., button 1034, to activate and/or deactivate recorder 1031, or to bring recorder 1031 into or out of a "standby" mode. In one embodiment, button 1034 may have a diameter of, for example, 15 millimeters, 20 millimeters, 25 millimeters, or the like, e.g., a size allowing a user to press the button 1034, a size allowing a gloved finger or a gloved hand to press the button 1034, or the like. Optionally, pressing the button 1034 may trigger a vibrating signal within recorder 1031, for example, indicating to the user that the press is registered and/or that an operational parameter of recorder 1031 is modified. In one embodiment, pressing the button 1034 may, for example, instruct recorder 1031 to store a single still image (e.g., in JPEG format) captured by camera 1021 or multiple still images (e.g., three consecutive JPEG images separated by a specific time interval). In some embodiments, a side of recorder mount 1030 may include a hole, an opening or a window to allow a user to reach and press the button 1034, e.g., using a finger, a hand, a gloved finger, a gloved hand, or the like.

In some embodiments, recorder mount 1030 may include one or more openings or windows to allow recorder 1031 to communicate with external devices, e.g., using wired or wireless links. For example, recorder mount 1030 may include a window allowing a socket or a port of recorder 1031 to transfer (e.g., upload or playback) audio/video data to an external monitor, display unit, playback unit, speaker, ear-phones, headset, player, or the like.

Mounting device 1000 may be mounted on, or attached to, various types of helmets 1050 or head-covers, for example, a motorbike helmet, a bicycle helmet, a soldier helmet, an army helmet, a fighting helmet, a pilot helmet, a helmet of law enforcement personnel, a policeman helmet, a SWAP unit helmet, a firefighter helmet, a miner helmet, a construction worker helmet, a miner helmet, a helmet used in extreme sport disciplines (e.g., mountain climbing, parachuting, skiing, car racing), or the like.

In accordance with some embodiments of the invention, mounting device 1000 may be, for example, substantially Velcro-free or Velcro-less, substantially glue-free or glue-less, substantially rubber-band-free or rubber-band-less, substantially tape-free or tape-less, substantially rope-free or rope-less, or the like. Thus, some embodiments of the invention may obviate the need to utilize Velcro, glue, rubber-bands, tapes or ropes in order to mount audio/video capturing equipment onto a helmet. Accordingly, some embodiments of the invention may provide a steady mounting, a secure mounting, a resistant mounting, a quick mounting, a reliable mounting, an efficient mounting, a relatively easy mounting, and/or other benefits and advantages.

Figure 3:
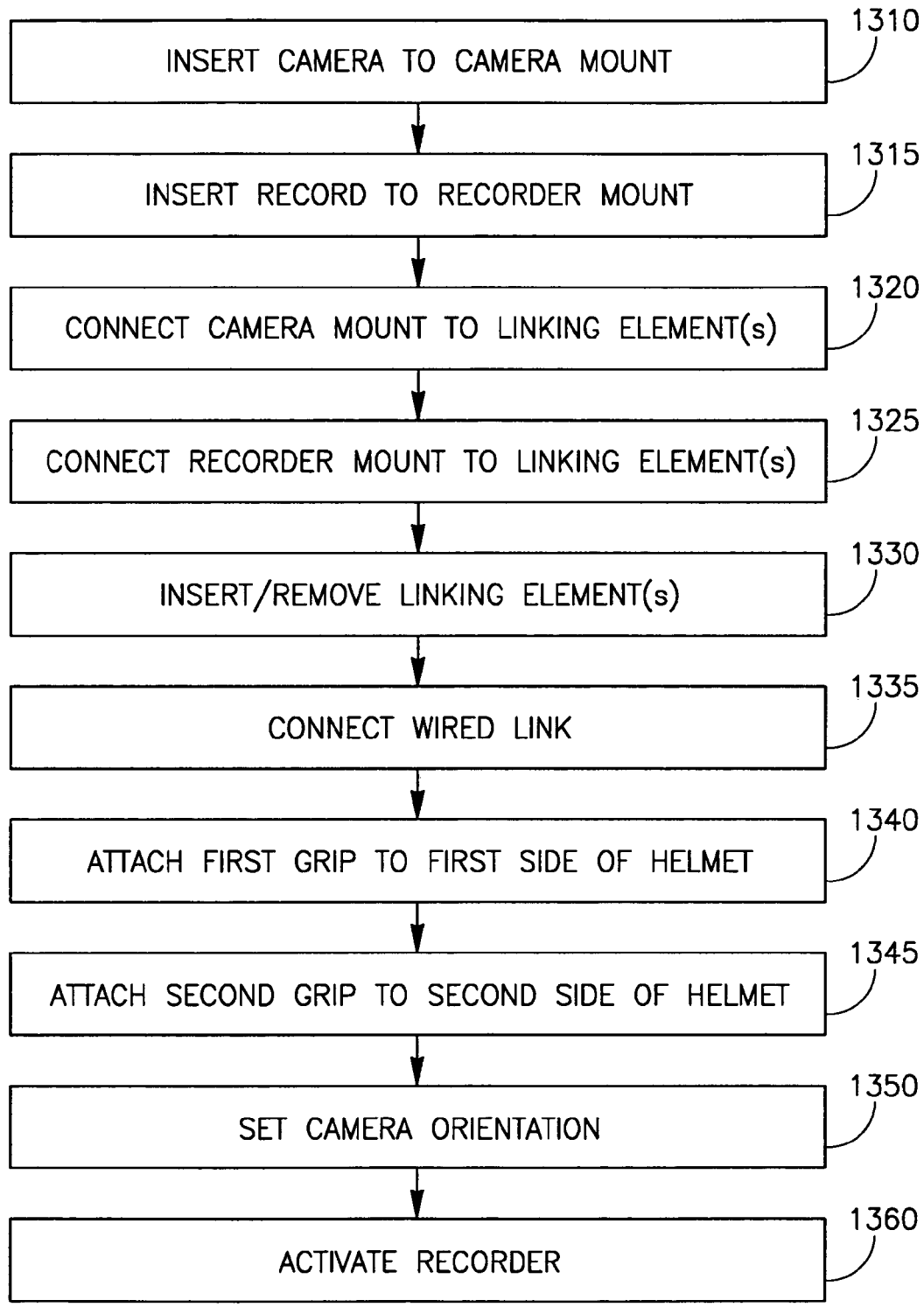
FIG. 3 is a schematic flow-chart of a method of mounting a camera and a recorder on a helmet, in accordance with an embodiment of the invention.

FIG. 3 is a schematic flow-chart of a method of mounting a camera and a recorder on a helmet in accordance with an embodiment of the invention. The method may be used, for example, in conjunction with mounting device 1000 and/or helmet 1050.

As indicated at block 1310, the method may optionally include, for example, inserting or otherwise connecting camera 1021 to camera mount 1023.

As indicated at block 1315, the method may optionally include, for example, inserting or otherwise connecting recorder 1031 to recorder mount 1030.

As indicated at block 1320, the method may optionally include, for example, connecting the camera mount 1023 to linking element(s) 1040.

As indicated at block 1325, the method may optionally include, for example, connecting the recorder mount 1030 to linking element(s) 1040.

As indicated at block 1330, the method may optionally include, for example, inserting or removing one or more linking element(s).

As indicated at block 1335, the method may optionally include, for example, connecting wired link 1035 between camera 1021 and recorder 1031. This may optionally include, for example, inserting the wired link 1035 through a hollow shaft of one or more linking element(s) 1040.

As indicated at block 1340, the method may optionally include, for example, attaching grip 1014 to a first side, e.g., a back side, of helmet 1050.

As indicated at block 1345, the method may optionally include, for example, attaching adjustable grip 1004 to a second side, e.g., a front side, of helmet 1.050. This may optionally include, for example, modifying the length of rail 1001 that protrudes out of rail housing 1003.

As indicated at block 1350, the method may optionally include, for example, modifying or setting the orientation of camera 1021 and/or camera mount 1023, e.g., using the orientation mechanism 1024.

As indicated at block 1360, the method may optionally include, for example, activating the recorder 103 1, e.g., by pressing the button 1034. This may include, for example, capturing audio data by microphone 1022 and storing the audio data in recorder 1031; capturing video data by camera 1021 and storing the audio data in recorder 1031; and/or providing power to camera 1021 by power source 1032 of recorder 1031.

Other suitable operations or sets of operations may be used.

Figure 4:
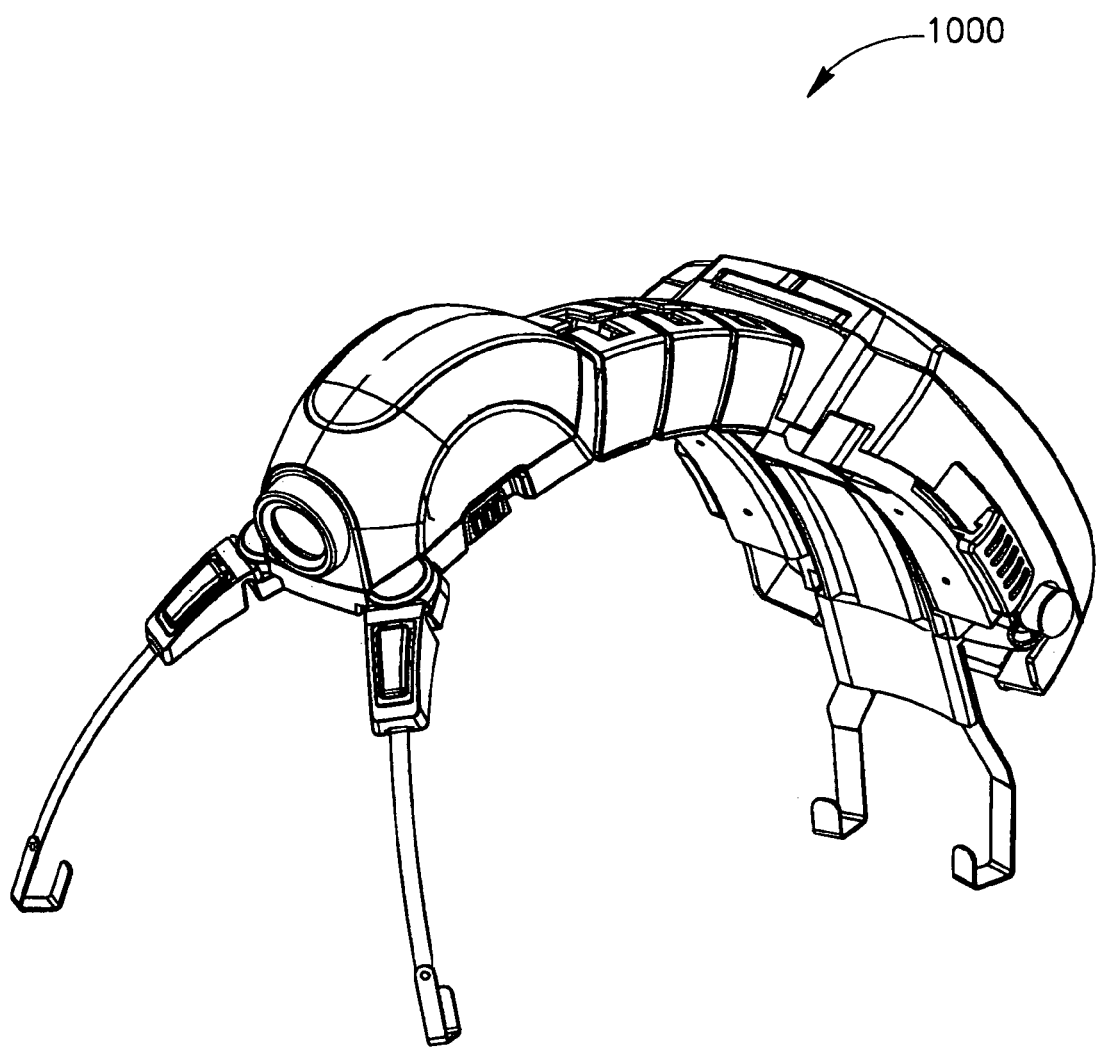
FIG. 4 is a schematic, isometric, illustration of a mounting device in accordance with another embodiment of the invention.

FIG. 4 schematically illustrates an isometric: view of the mounting device 1000 in accordance with an embodiment of the invention.

Figure 5:
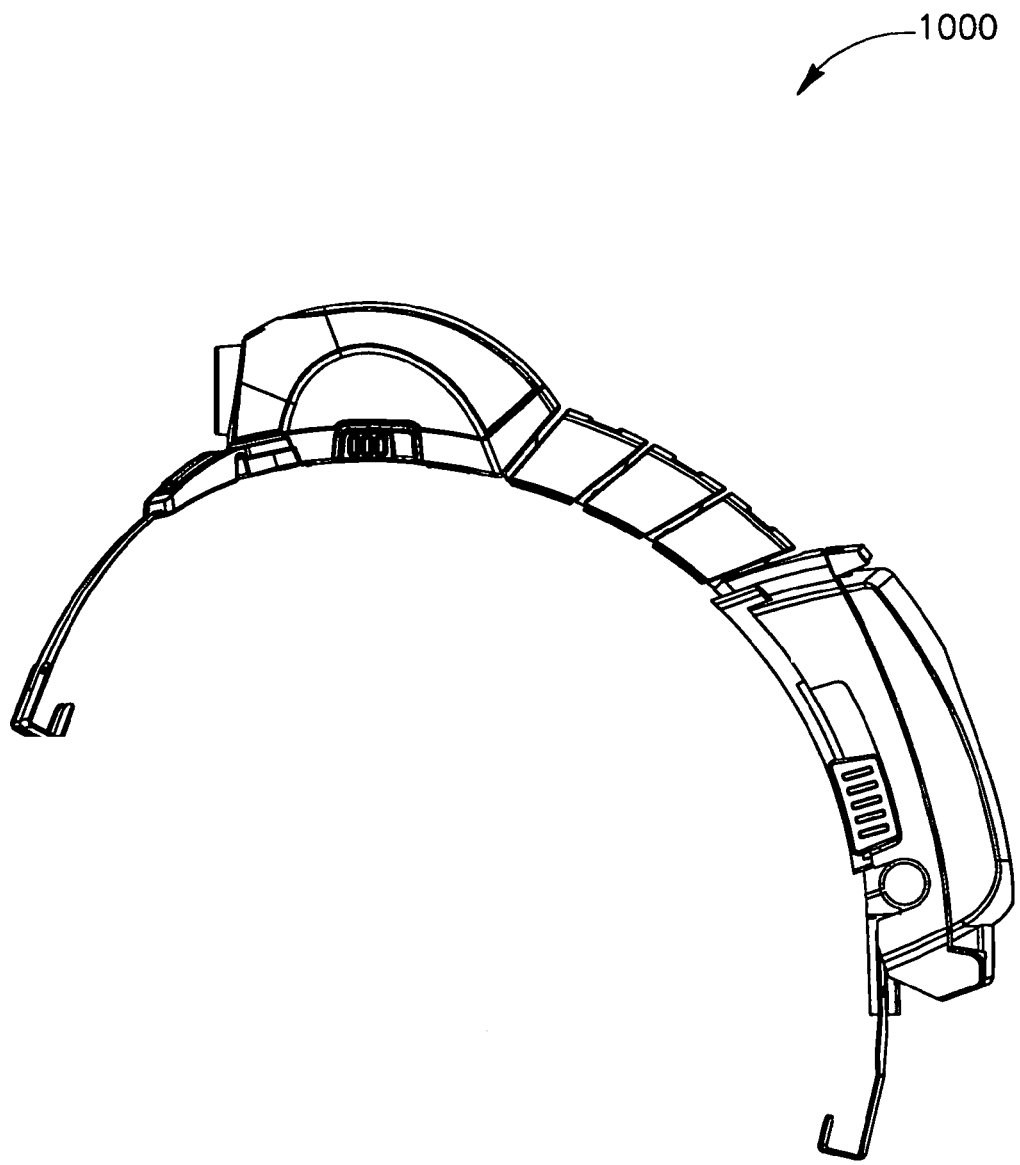
FIG. 5 is a schematic, side view, illustration of a mounting device in accordance with an embodiment of the invention.

FIG. 5 schematically illustrates a side view of the mounting device 1000 in accordance with an embodiment of the invention.

Figure 6:
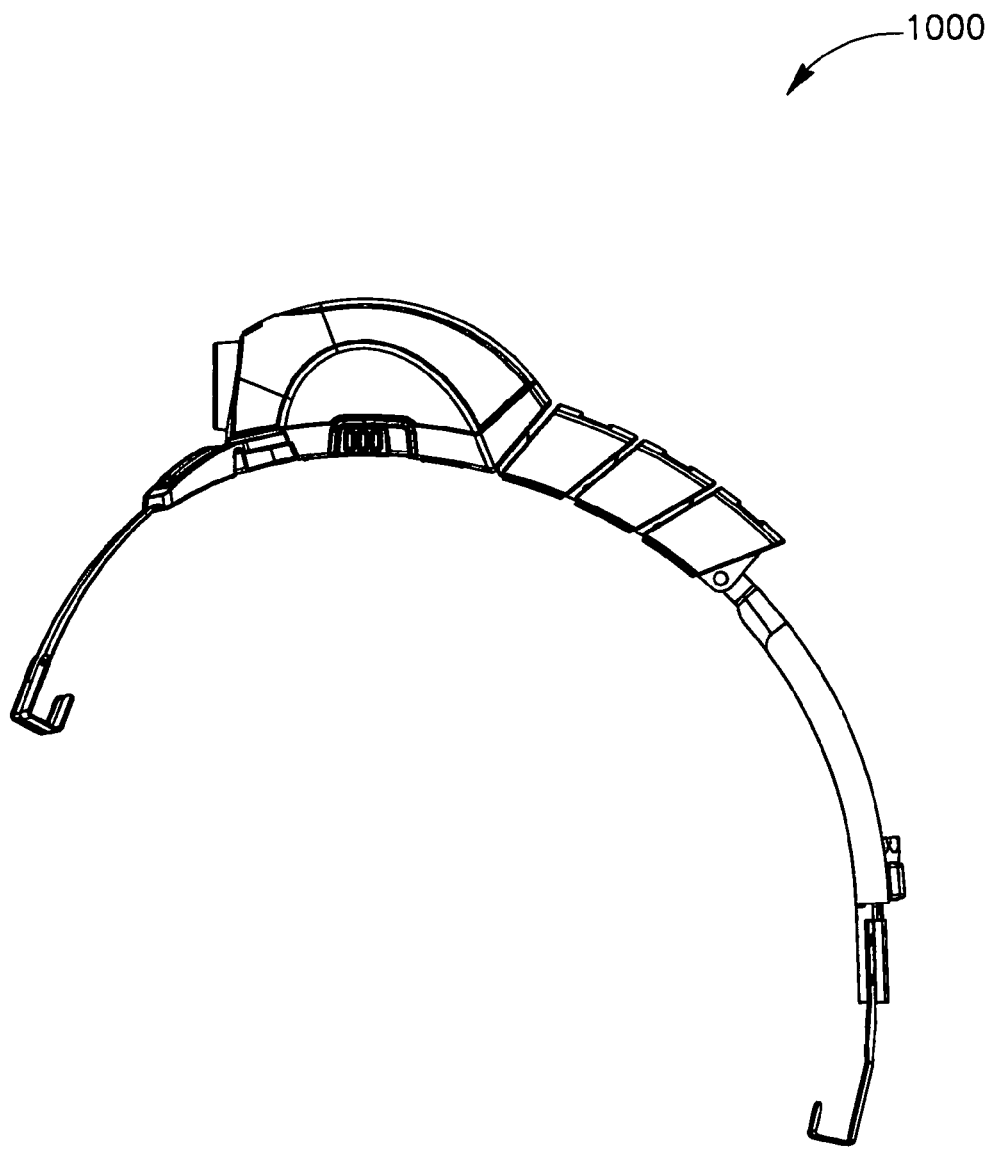
FIG. 6 is a schematic illustration of a side view of a mounting device of in accordance with an embodiment of the invention, having removed therefrom the recorder mount and the recorder.

FIG. 6 schematically illustrates a side view of the mounting device 1000 in accordance with an embodiment of the invention, having removed therefrom the recorder mount 1030 and the recorder 1031. In some embodiments, for example, recorder mount 1030 and the recorder 1031 may be detachable, e.g., removable from mounting device 1000. Such removal may be used, for example, to connect recorder 1031 to a computing platform or a display unit, or to allow replacement, fixing, maintenance or cleaning of recorder mount 1030 and/or recorder 1031.

Figure 7:
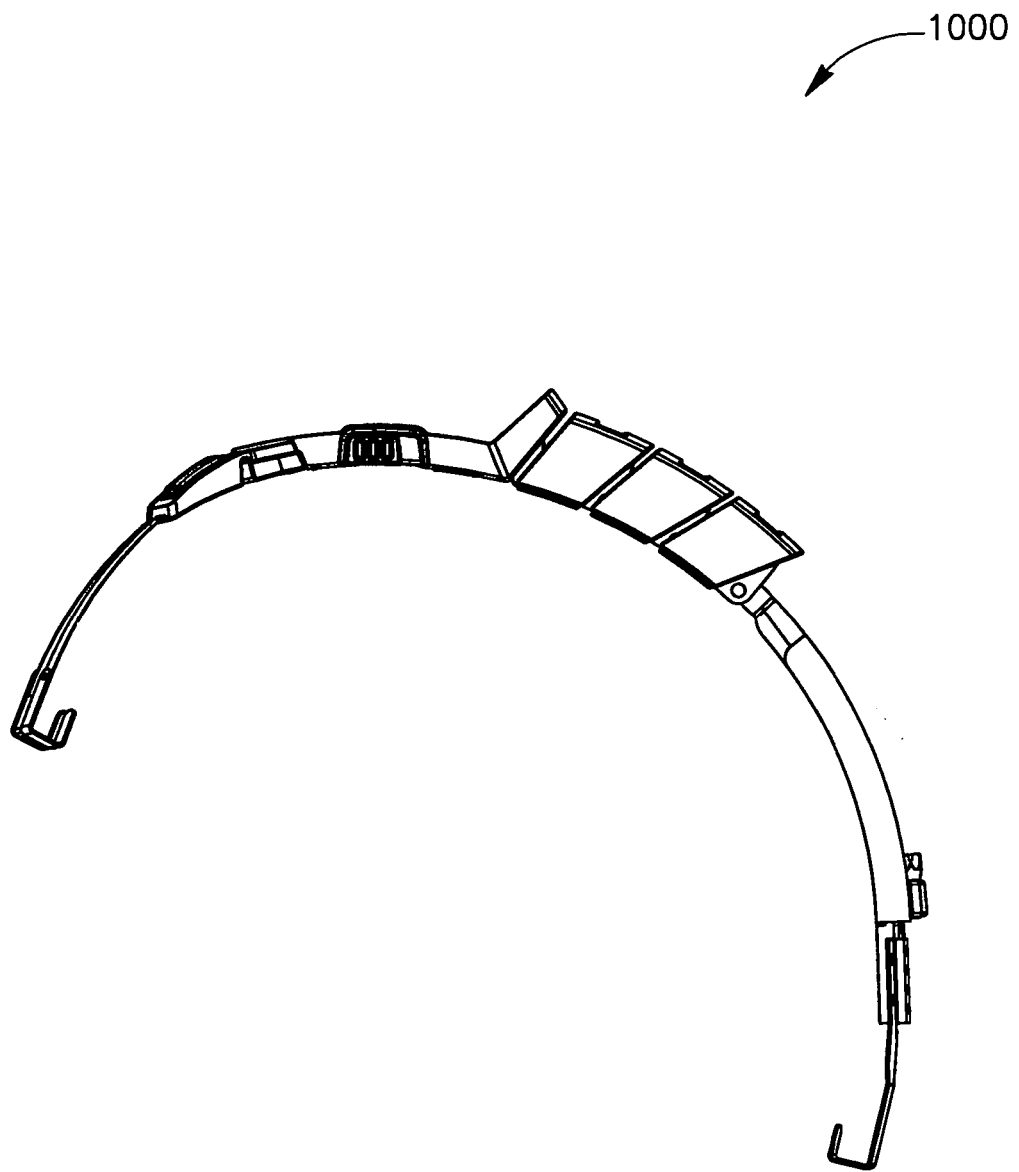
FIG. 7 is a schematic illustration of a side view of a mounting device in accordance with an embodiment of the invention, having removed therefrom the recorder mount, the recorder, the camera mount and the camera.

FIG. 7 schematically illustrates a side view of the mounting device 1000 in accordance with an embodiment of the invention, having removed therefrom the recorder mount 1030, the recorder 1031, the camera mount 1023 and the camera 1021. In some embodiments, for example, camera mount 1023 and/ or camera 1021 may be detachable, e.g., removable from mounting device 1000. Such removal may be used, for example, to allow replacement, fixing, maintenance or cleaning of the camera mount 1023 and/or the camera 1021.

Figure 8:
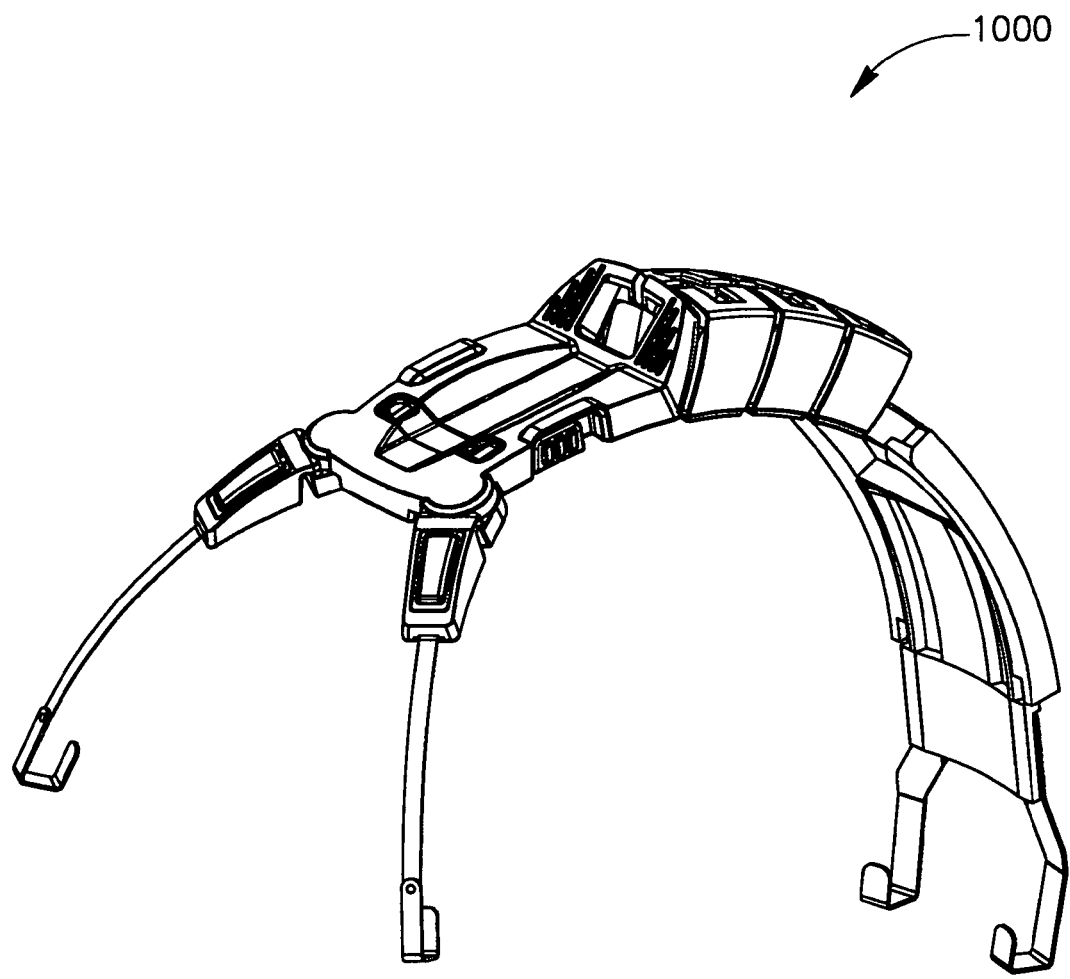
FIG. 8 is a schematic isometric illustration of a side view of a mounting device in accordance with an embodiment of the invention.

FIG. 8 schematically illustrates an isometric side view of the mounting device 1000 in accordance with an embodiment of the invention.

Figure 9:
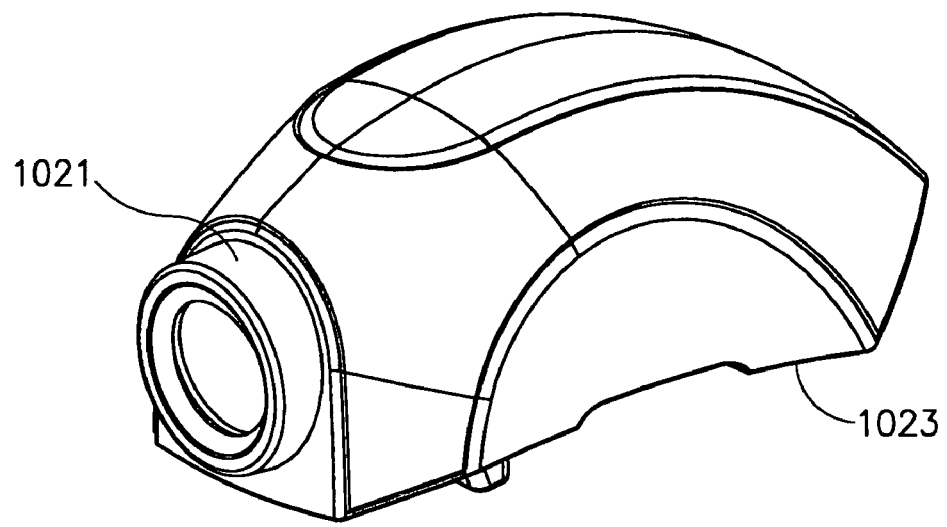
FIG. 9 is a schematic isometric illustration of a camera mount including therein a camera, in accordance with an embodiment of the invention.

FIG. 9 schematically illustrates an isometric side view of camera mount 1023, including therein camera 1021, in accordance with an embodiment of the invention.

Figure 10:
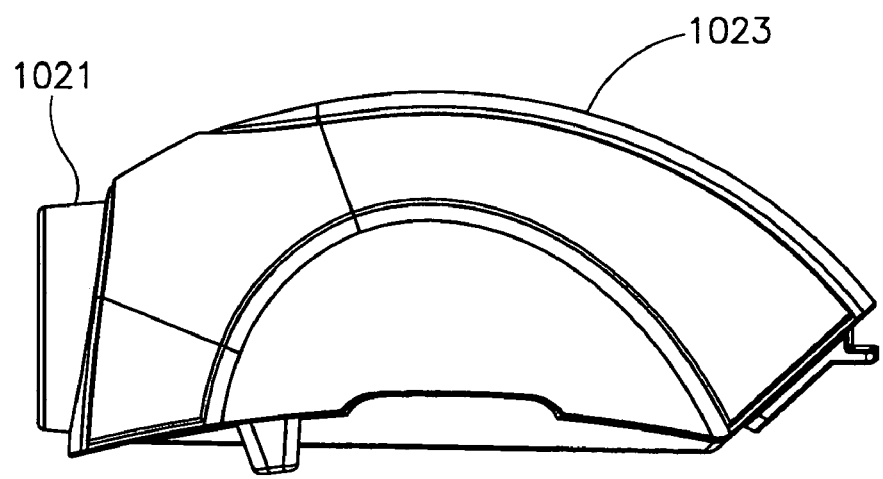
FIG. 10 is a schematic illustration of a side view of a camera mount, including therein a camera in accordance with an embodiment of the invention.

FIG. 10 schematically illustrates a side view of camera mount 1023 of FIGS. 1-2, including therein camera 1021 in accordance with an embodiment of the invention.

Figure 11:
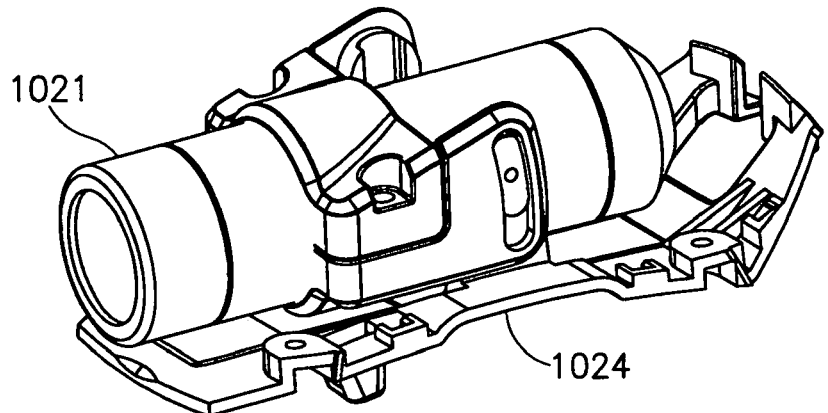
FIG. 11 is a schematic isometric illustration of a camera in accordance with an embodiment of the invention.

FIG. 11 schematically illustrates an isometric side view of camera 1021, implemented using a "lipstick"-type camera, held by a holding mechanism internal to camera mount 1023, and further showing orientation mechanism 1024, in accordance with an embodiment of the invention.

Figure 12:
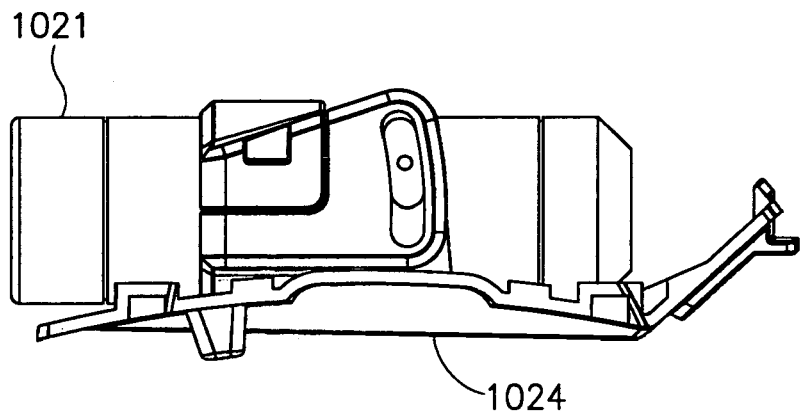
FIG. 12 is a schematic illustration of a first side view of a camera, oriented at a first, substantially horizontal, orientation angle, in accordance with an embodiment of the invention.

FIG. 12 schematically illustrates a first side view of camera 1021, oriented at a first, substantially horizontal, orientation angle, in accordance with an embodiment of the invention.

Figure 13:
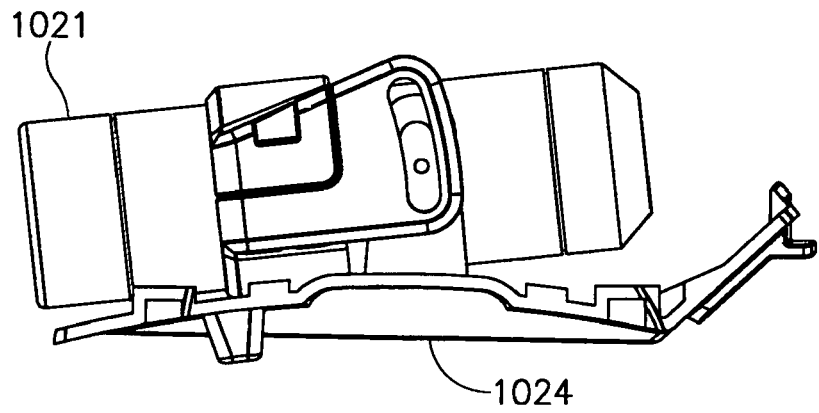
FIG. 13 is a schematic illustration of a second side view of a camera, oriented at a second, non-horizontal, orientation angle, in accordance with an embodiment of the invention.

FIG. 13 schematically illustrates a second side view of camera 1021, oriented at a second, non-horizontal, orientation angle, in accordance with an embodiment of the invention.

Figure 14:
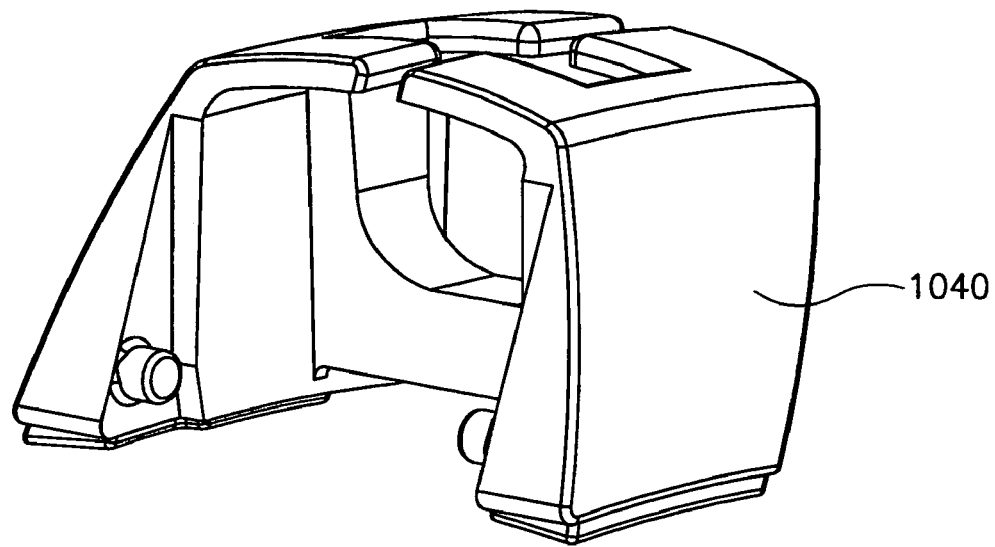
FIG. 14 is a first schematic isometric illustration of a linking element in accordance with an embodiment of the invention.

FIG. 14 schematically illustrates a first isometric side view of linking element, in accordance with an embodiment of the invention.

Figure 15:
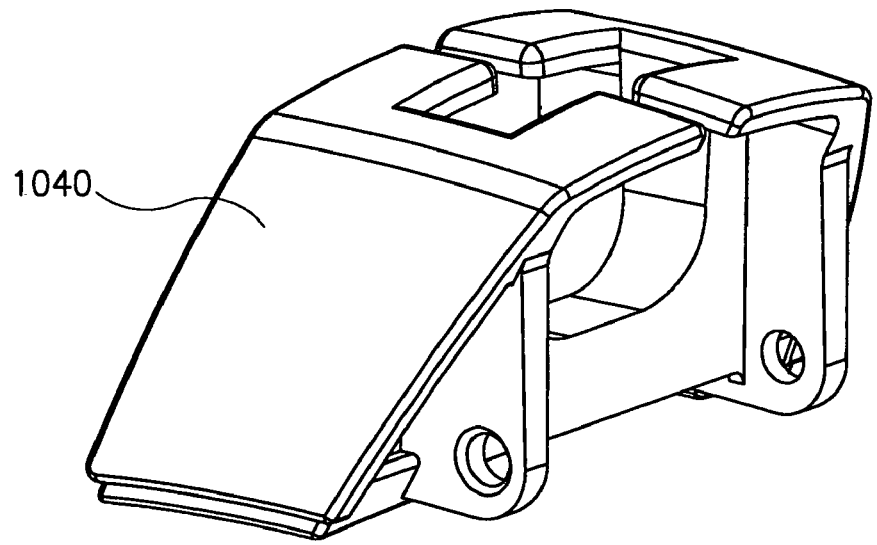
FIG. 15 is a second schematic isometric illustration of a linking element, in accordance with an embodiment of the invention.

FIG. 15 schematically illustrates a second isometric side view of linking element 1040, in accordance with an embodiment of the invention.

Figure 16:
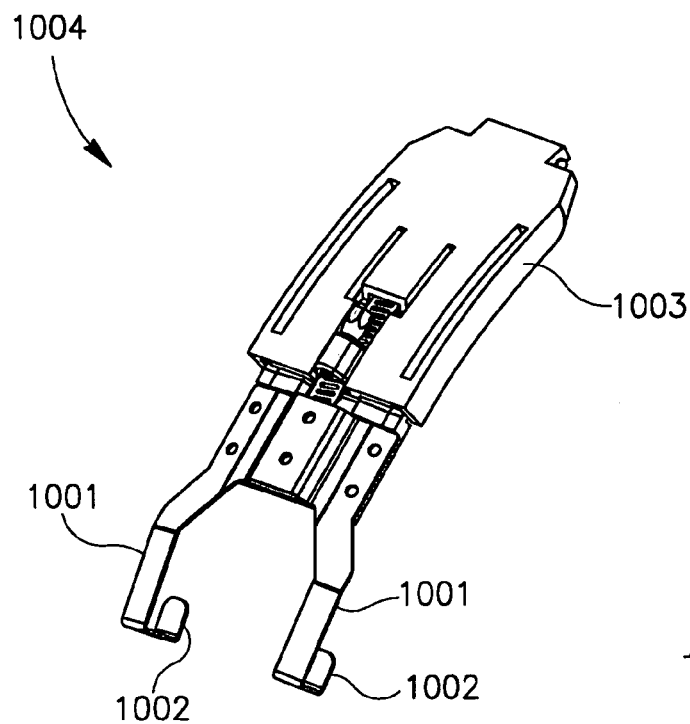
FIG. 16 is a schematic isometric illustration of a grip in accordance with an embodiment of the invention.

FIG. 16 schematically illustrates a first isometric side view of grip 1004, in accordance with an embodiment of the invention. Grip 1004 is shown such that rails 1001 are substantially included within rail housing 1003, i.e., such that only a relatively small portion of rails 1001 protrudes out of rail housing 1003.

Figure 17:
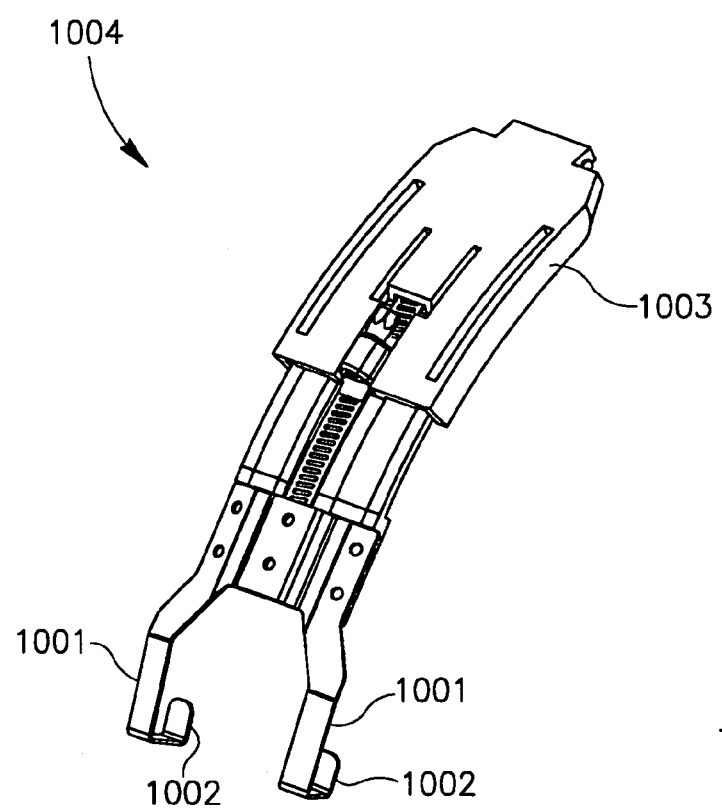
FIG. 17 is a schematic isometric illustration of a grip in accordance with an embodiment of the invention.

FIG. 17 schematically illustrates a second isometric side view of grip 1004, in accordance with an embodiment of the invention. Grip 1004 is shown such that rails 1001 are substantially outside of rail housing 1003, i.e., such that a large portion of rails 1001 protrudes out of rail housing 1003.

Figure 18:
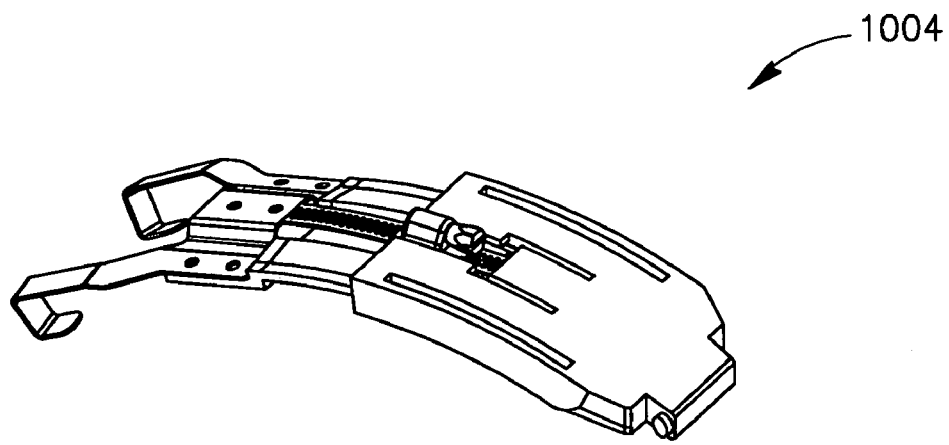
FIG. 18 is a schematic isometric illustration of a grip in accordance with an embodiment of the invention.

FIG. 18 schematically illustrates another isometric side view of grip 1004, in accordance with an embodiment of the invention.

Figure 19:
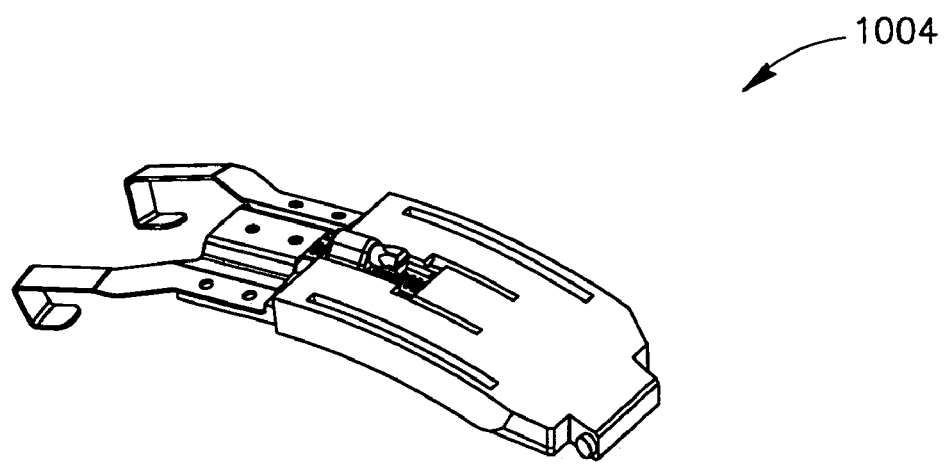
FIG. 19 is a schematic isometric illustration of a grip in accordance with an embodiment of the invention.

FIG. 19 schematically illustrates yet another angular side view of grip 1004, in accordance with an embodiment of the invention.

Figure 20:
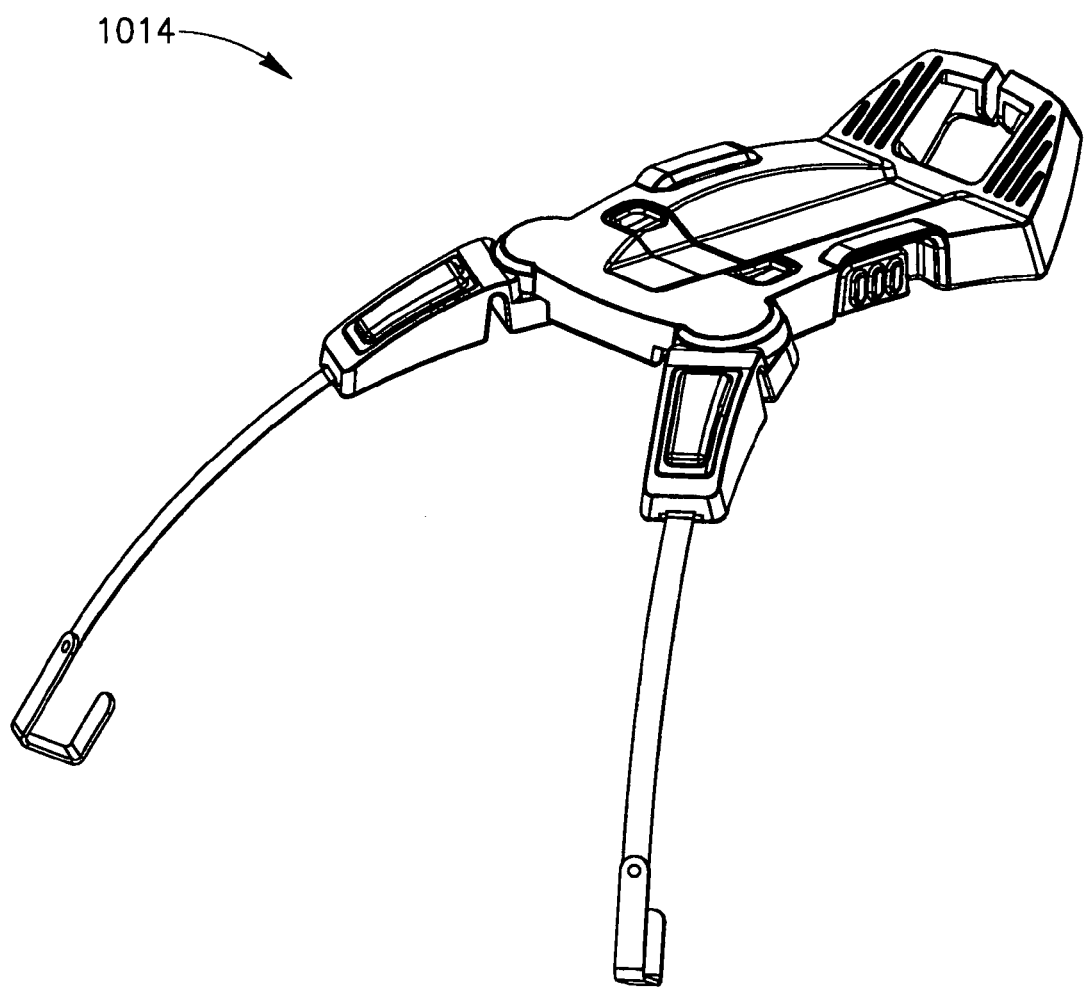
FIG. 20 is a schematic isometric illustration of a back grip in accordance with an embodiment of the invention.

FIG. 20 schematically illustrates an angular side view of grip 1014 of, in accordance with an embodiment of the invention. Grip 1014 is shown non-connected to recorder mount 1030 and recorder 1031.

It will be appreciated that the term "link" as used hereinbelow may include, for example, one or more cables, wires, connectors, conductors, or the like, and may include a wired and/or wireless link.

It will be appreciated that the term "port" as used herein may include, for example, any suitable connector, connection, interface, socket, terminal, plug, pin, ball, exit socket or port, entry socket or port, "in" socket or port, "out" socket or port, transmitter socket or port, receiver socket or port, or other connector or port able to receive or transmit data or signals as input and/or output.

It will be appreciated that the term "A/V data" as used herein may include, for example, data representing video, data representing audio, or data representing audio and video.

It will be appreciated that the term "processor" as used herein may include, for example, a Central Processing Unit (CPU), a Digital Signal Processor (DSP), a microprocessor, a plurality of processors, a controller, a chip, a microchip, a circuit, a processing circuit, a sub-circuit, circuitry, or any other suitable multi-purpose or specific processor or controller or circuit.

It will be appreciated that the term "recorder" as used herein may include, for example a specific or multi-purpose unit or sub-unit or processor able to record data representing audio and/or video recording in accordance with embodiments of the invention.

Figure 21:
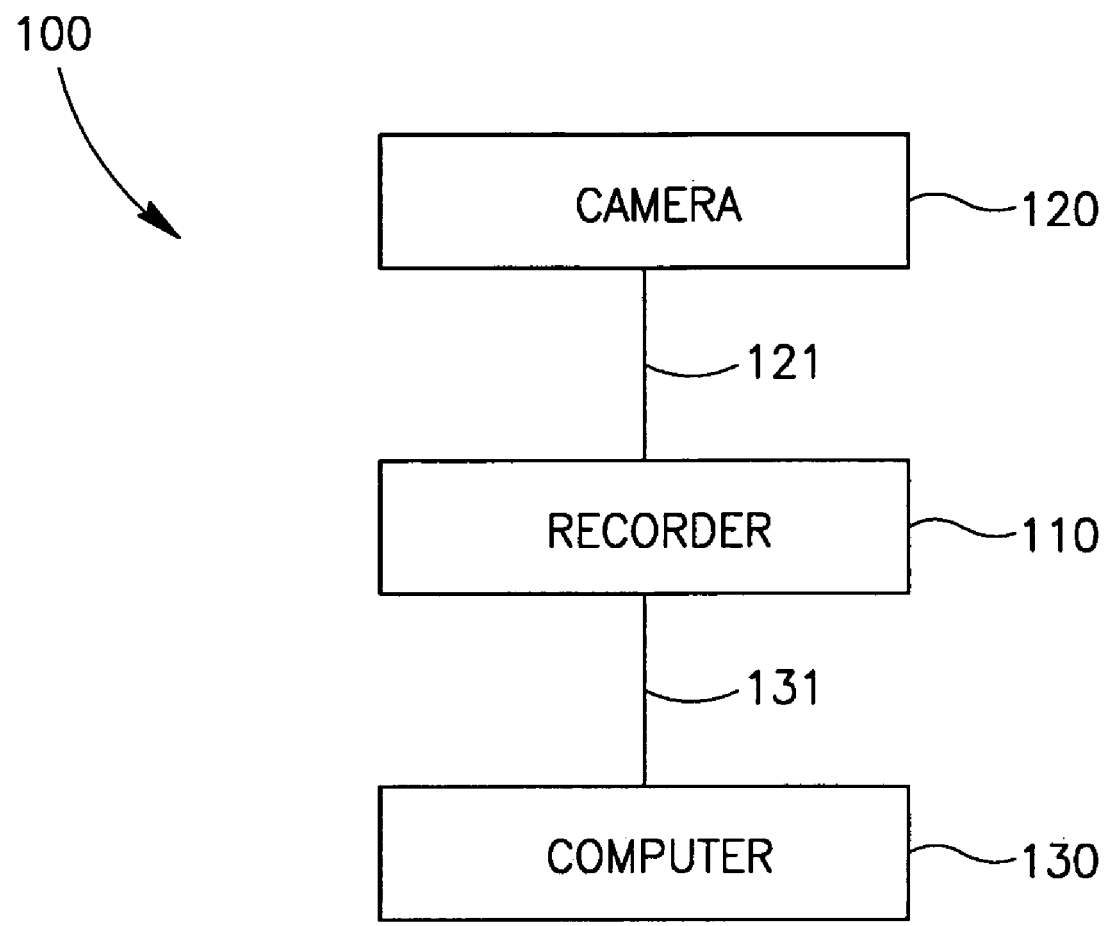
FIG. 21 is a schematic illustration of a block diagram of a digital A/V data recording system incorporating a camera, a computer, and a recorder in accordance with an embodiment of the invention.

Reference is now made to FIG. 21, which schematically illustrates a block diagram of a recording system 100 incorporating a camera 120, a computer 130, and a digital A/V data recorder 1 10 in accordance with an exemplary embodiment of the invention.

Camera 120 may include, for example, an A/V camera able to capture audio and/or video. In some embodiments, camera 120 may be relatively small in size, for example, may be similar in shape, size or diameter to a 25-cents coin (e.g., a diameter of approximately 24 millimeters and a thickness or approximately 2, 3, 4 or 5 millimeters) or a button or a similar small object, and may be relatively easily concealed. Camera 120 may include, for example, one or more lens, a focusing mechanism, an illumination unit, a Charge Coupled Device (CCD) camera, a Complementary Metal Oxide Semiconductor (CMOS) camera, an optional microphone to capture audio, and/or other suitable cameras having various sizes and properties.

Computer 130 may include or may be, for example, a personal computer, a desktop computer, a mobile computer, a laptop computer, a notebook computer, a terminal, a workstation, a server computer, a Personal Digital Assistant (PDA) device, a tablet computer, a network device, or other suitable computing platform or computing device.

Recorder 110 may be connected to camera 120, for example, through a link 121. Recorder 110 may receive A/V data from camera 120, in an analog format or in a digital format. Optionally, if recorder 110 receives A/V data in an analog format, recorder 110 may convert the received A/V data from the analog format to a digital format. Recorder 110 may compress the digital A/V data in accordance with a pre-defined scheme or algorithm, and may store the compressed A/V data on a storage device, e.g., a microdrive hard-disk drive, a Compact Flash (CF) storage device, a Flash memory, or another relatively small storage device.

Recorder 120 may be connected to computer 130, for example, through a link 130. Computer 130 may access and retrieve the compressed A/V data stored in recorder 110.

It is noted that in some embodiments, link 121 and link 131 may not be simultaneously operational. For example, recorder 110 may first be connected to camera 120 through link 121 and may receive, compress and store A/V data. Then, recorder 110 may optionally be disconnected from camera 120 and may be connected to computer 130 through link 131, to allow computer 130 to access and retrieve the compressed A/V data stored in recorder 110.

Figure 22:
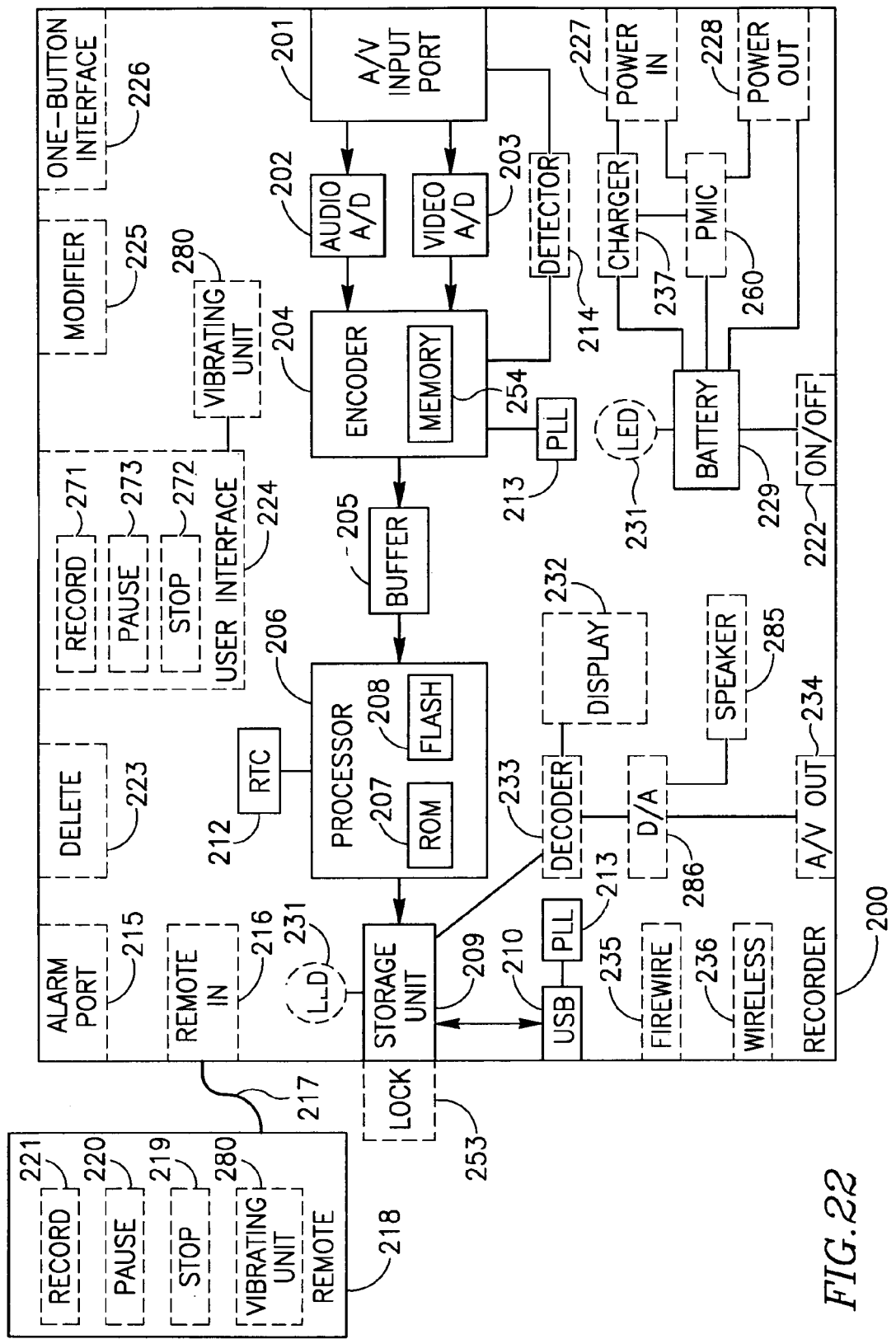
FIG. 22 is a schematic illustration of a block diagram of a digital A/V data recorder in accordance with an embodiment of the invention.

FIG. 22 schematically illustrates a block diagram of a digital data recorder 200 in accordance with some exemplary embodiments of the invention. Recorder 200 may be an example of recorder 110 of FIG. 21. Recorder 200 may be suitable for compression and recording of digital A/V data in accordance with some embodiments of the invention, and may include optional components which may provide recorder 200 with optional functionalities as detailed herein.

Recorder 200 may include, for example, an A/V input port 201, able to receive signals carrying A/V data. In some embodiments, A/V input port 201 may include, for example, a 3.5 millimeter minijack stereo A/V connector able to receive audio and video signals from a single A/V plug. A/V input port 201 may receive A/V data, for example, in an analog format from a camera, e.g., camera 120 of FIG. 21. Although a single A/V input port 201 is shown, able to receive signals carrying both audio and video data, a plurality of A/V input ports 201 may be used, e.g., a first input port to receive video signals and a second input port to receive audio signals, or a first input port to receive video signals and a second and third input ports to receive audio signals.

In one embodiment, the received A/V data may be in a digital format. In an alternate embodiment, the received A/V data may be in an analog format, and recorder 200 may convert the A/V data to a digital format. The received analog A/V data may be transferred from A/V input port 201 to one or more Analog to Digital (A/D) converters. For example, A/V input port 201 may transfer received audio data to an audio A/D converter 202, and may transfer received video data to a video A/D converter 203. Audio A/D converter 202 may include, for example, a processor able to convert audio data from an analog format to a digital format. In one embodiment, for example, audio A/D converter 202 may include a single ended, 24-bit audio A/D converter model AK5380 made by AKM. Video A/D converter 203 may include, for example, a processor able to convert video data from an analog format to a digital format. In one embodiment, for example, video A/D converter 203 may include a video input processor model SAA7113H made by Philips. Although two separate A/D converters 202 and 203 are shown, some embodiments may include a combined A/V A/D converter able to convert both audio and video data from an analog format to a digital format.

The digital A/V data, which was converted by A/D converters 202 and 203 or directly received from A/V input port 201, may be transferred to an encoder 204. Encoder 204 may include, for example, a processor able to encode or compress the digital A/V data, e.g., in accordance with a pre-determined encoding or compression algorithm or codec. The encoding or compression algorithm or codec may include, for example, Moving Picture Experts Group (MPEG), MPEG-1, MPEG-2, MPEG-3, MPEG4, DivX, XviD, Video CD (VCD) format, Super VCD (SVCD) format, Joint Photographic Experts Group (JPEG), Motion-JPEG (MJPEG), Photo-JPEG, Windows Media Video, Windows Media Audio, one or more layers associated with MPEG encoding, RealVideo, RealAudio, H261, 1263, Cinepak, Indeo, QuickTime, Digital Video Camera (DV-Cam), Four Character Code (FourCC), Lempel-Ziv-Welch (LZW), Huffman, Run Length Encoding (RLE), or other suitable lossy or substantially lossless algorithms or codecs.

Encoder 204 may optionally include a memory unit 254, e.g., able to store code, microcode, programmable microcode and/or data which may be used by encoder 204 during its operation. For example, memory unit 254 may include data or microcode indicating a bit-rate used during encoding operations, e.g., indicating a bit-rate of 128 kilobits per second.

In one embodiment, encoder 204 may include, for example, an MPEG-2 encoder model MB86393 made by Fujitsu, and may include a memory unit 254 of Synchronous Dynamic Random Access Memory (SD-RAM).

The compressed A/V data generated by encoder 204 may be transferred to a buffer 205, which may include, for example, a memory unit able to store data. Buffer 205 may include, for example, a First-In-First-Out (FIFO) buffer having a storage capacity of two kilobytes of data. Buffer 205 may optionally include a controller to control the operation of buffer 205, and/or an adaptation mechanism to allow buffer 205 to operate in association with various data transfer rates, e.g., using a bus width conversion mechanism. In one embodiment, for example, buffer 205 may include an eight kilobytes FIFO buffer able to operate at ×18 speed and including a bus width conversion mechanism, e.g., buffer model IDT72V263 made by IDT.

A processor 206 may be connected to buffer 205, and may be able to read data from buffer 205. For example, when the data stored in buffer 205 fills more than a pre-determined percentage, e.g., 50 percent, of the maximum storage capacity of buffer 205, then buffer 205 may send a signal to processor 206. Upon receiving the signal, processor 206 may read the compressed A/V data stored in buffer 205, and may write the compressed A/V data into a storage unit 209. In one embodiment, processor 206 may include, for example, a 30 MHz, 32-bit micro-controller having 512 kilobytes of Flash memory, e.g., micro-controller model M30833F made by Renesas Technology Corporation.

In some embodiments, buffer 205 may include a FIFO buffer, and the reading operation by processor 206 may free a storage space in buffer 205. Processor 206 may optionally include a Read Only Memory (ROM) 207, for example, able to store a Basic Input/Output System (BIOS) controlling the operation of processor 206. Processor 206 may optionally include a Flash memory 208, for example, a memory able to store code used in controlling the operation of processor 206 and/or data used during the operation of processor 206.

Storage unit 209 may include, for example, a hard-disk drive or a Flash memory able to store the encoded A/V data written by processor 206. In one embodiment, for example, storage unit 209 may include a hard-disk drive in a microdrive format, e.g., a four-gigabyte hard-disk drive in microdrive format, CompactFlash (CF) compatible, model HMS360404D5CF00, made by Hitachi/IBM.

In one embodiment, storage unit 209 may include a fixed and/or non-removable storage unit, e.g., a fixed hard-disk. In an alternate embodiment, storage unit 209 may include a removable storage unit, e.g., a removable hard-disk which may be detached and removed from recorder 200. In some embodiments, removable storage unit 209 may be removed from recorder 200 and may be inserted or connected to an external device, e.g., computer 130, a microdrive reader, a CF reader, a Flash memory reader, or the like, thereby allowing the external device to access, read, modify and/or delete the compressed A/V data stored in storage unit 209.

In another embodiment, storage unit 209 may include a removable storage unit locked by a lock 253, which may not allow unauthorized removal of storage unit 209 from recorder 200. For example, lock 253 may include a locking mechanism allowing removal of removable storage unit 209 using a key, or not allowing any removal of removable storage unit 209. This may allow, for example, using recorder 200 while avoiding In some embodiments, processor 206 may write A/V data into storage unit 209 using discrete portions, e.g., using data blocks, packets and/or files. In one embodiment, data may be written as one or more MPEG or MPEG-2 files, and/or using a file extension of "MPG" or "MPEG" or "MP2".

Storage unit 209 may be connected to a Universal Serial Bus (USB) port 210, which may include, for example, a port able to send and/or receive data in accordance with USB interface. USB port 210 may include, for example, a USB 1.0 port, a USB 1.1 port, a USB 2.0 port, a Plug-and-Play USB port, a mini-USB port, or other suitable ports. USB port 210 may include a USB device manager, for example, to control the operation of USB port 210. In one embodiment, for example, USB port 210 may include a USB 2.0 device manager model NET2270 made by NetChip. USB port 210 may connect storage unit 209 to, for example, computer 130 of FIG. 21, and may allow computer 130 to access and retrieve the compressed A/V data stored in storage unit 209.

In some embodiments, USB port 210 may optionally allow bidirectional communication between recorder 200 and an external device, e.g., computer 130 of FIG. 21. For example, in addition to allowing computer 130 to read A/V data stored in storage unit 209, USB port 210 may allow computer 130 to modify or delete A/V data stored in storage unit 209.

In some embodiments, recorder 200 may optionally include one or more other communication ports, instead of or in addition to USB port 210, to allow computer 130 to access and retrieve the compressed A/V data stored in storage unit 209. In one embodiment, for example, recorder 200 may optionally include an IEEE 1394 High Performance Serial Bus interface 235, e.g., an Apple FireWire interface or a Sony i.LINK interface.

In another embodiment, recorder 200 may optionally include a wireless interface 236 to allow computer 130 wireless access to the compressed A/V data stored in storage unit 209. Wireless interface 236 may include, for example, a transmitter, a receiver, a transmitter-receiver, a transceiver, an antenna, and/or other suitable units able to send and/or receive wireless signals. In some embodiments, wireless interface 236 may operate in accordance with one or more wireless communication standards or protocols, for example, 802.11, 802.11a, 802.11b, 802.11g, 802.16, Wi-Fi, Wi-Max, BlueTooth, Infra-Red (IR), or the like.

In some embodiments, recorder 200 may include a Phase-Locked Loop (PLL) 213 or a plurality of PLLs 213, for example, able to provide timing and/or synchronization for one or more components of recorder 200, e.g., encoder 204 or USB port 210. In one embodiment, for example, PLL 213 may include three programmable PLLs model CY22393 made by Cypress.

In some embodiments, recorder 200 may include a Real Time Clock (RTC) 212, for example, able to store data representing a time and/or date, or able to generate or store one or more parameters used in the operation of recorder 200. In one embodiment, for example, RTC 212 may include a low power RTC having an internal Random Access Memory (RAM), e.g., model MAX6900 made by Maxim. RTC 200 may, for example, generate data indicating a time, which may be used by processor 206 to produce a time-stamp associated with a compressed A/V data file written by processor 206 onto storage unit 209.

In some embodiments, recorder 200 may include a battery 229 able to provide power to one or more components of recorder 200. Battery 229 may include one or more power cells, removable batteries, non-removable batteries, replaceable batteries, non-replaceable batteries, rechargeable batteries and/or non-rechargeable batteries. In one embodiment, for example, battery 229 may include a rechargeable lithium-ion battery having a nominal voltage of 3.6V and a nominal capacity of 1950 mAh, e.g., model CGA103450A made by Panasonic. In one embodiment, battery 229 may provide power allowing recorder 200 to record A/V data for a period of about 3 hours. In some embodiments, recorder 200 may be self-powered, for example, battery 229 may provide sufficient power to recorder 200 and/or substantially all the components of recorder 200. In some embodiments, for example, recorder 200 may be self-powered and may not be connected to an external power source, e.g., to an Alternating Current (AC) source providing a voltage of approximately 110 or 220 volts. In some embodiments, for example, recorder 200 recorder 200 may be self-powered and may not include a power converter, e.g., to receive an external voltage or current and to convert, increase or decrease the received voltage or current to generate a current or voltage used by recorder 200.

In some embodiments, battery 229 may include a rechargeable battery connected to a battery charger 237, which may be connected to a power-in port 227 able to receive an input voltage. An external power source may provide power to charger 237 through power-in port 227, allowing charger 237 to charge or recharge the rechargeable battery 229, and/or to provide an operational power to one or more components of recorder 200. For example, in one embodiment, charger 237 may receive through power-in port 227 an input voltage of between 5V and 12V, and may charge or recharge battery 229 and/or provide an operational power to one or more components of recorder 200. In one embodiment, for example, charger 237 may include battery charger model MCP73843 made by MicroChip.

In some embodiments, battery 229 may optionally be connected to a power-out port 228 able to output a voltage, for example, to provide power to an external device, e.g., camera 120, a microphone, an illumination device, or the like. For example, battery 229 may output through power-out port 228 a Direct Current (DC) of 500 mA or a voltage of 5V.

In some embodiments, recorder 200 may optionally include a Power Management Integrated Circuit (PMIC) 260, for example, to control and/or monitor the operation of one or more of battery 229, charger 237, power-in port 227 and/or power-out port 228. For example, in one embodiment, PMIC 260 may include a triple-output PMIC model MAX1702B made by Maxim.

Recorder 200 may optionally include an on/off switch 222, able to turn recorder 200 on and off. Switch 222 may include, for example, a slide switch, and may be connected to battery 229 and/or to other components of recorder 222. Upon turning switch 222 on, recorder 200 may, for example, perform initialization operations, warming-up operations or other pre-recording preparatory operations, and may be operational and ready to record A/V data in response to one or more triggering events as detailed herein. Upon turning switch 222 off, recorder 200 may, for example, finalize outstanding operations and terminate the operation of one or more components of recorder 200.

Recorder 200 may record digital A/V data in response to one or more triggering events. In one embodiment, for example, recorder 200 may record digital A/V data in response to a triggering signal received from an external device through an alarm port 215. For example, recorder 200 may be connected through a link to an alarm system, which may send a triggering signal upon detection of a pre-defined movement or any movement. In some embodiments, recorder 200 may be turned on automatically and/or may record A/V data automatically upon receiving the triggering signal. In one embodiment, upon receiving a triggering signal, recorder 200 may record A/V data for a pre-defined period of time, e.g., thirty seconds.

Recorder 200 may record digital A/V data in response to an instruction provided by a user of recorder 200, for example, through a user interface 224 which may include one or more buttons or switches. For example, interface 224 may include a "record" button 271, which, when pressed by a user, may activate a recording session of recorder 200, e.g., by beginning to record digital A/V data into a new MPEG-2 file stored in storage unit 209. Interface 224 may further include a "stop" button 272, which, when pressed by a user, may terminate a recording session of recorder 200, e.g., by finalizing a creation of a MPEG-2 file stored in storage unit 209.

Interface 224 may further include a "pause" button 273, which, when pressed by a user during a recording session of recorder 200, may temporarily suspend the recording session without finalizing the creation of a MPEG-2 file stored in storage unit 209, and allowing a continuous recording of A/V data into a currently open MPEG-2 file upon a subsequent press by a user. In some embodiments, "pause" button 273 may temporarily suspend a recording session for a pre-defined period of time, e.g., ten minutes; when the pre-defined period of time elapses, in one embodiment, the recording session may automatically resume, or, in an alternate embodiment, the recording session may automatically terminate.

Recorder 200 may record digital A/V data in response to an instruction provided by a user of recorder 200, for example, through a remote control 218 connected to recorder 200 through a wired or wireless link 217 and a remote control input port 216. Remote control 218 may include one or more buttons or switches, for example, similar to "record" button 271, "stop" button 272, and/or "pause" button 273.

In some embodiments, a plurality of instructions may be provided using one button included in interface 224 or remote control 218. For example, in one embodiment, a multi-switch may be used to switch between a "record" state, a "pause" state, and a "stop" state. In an alternate embodiment, a push-button may be used, for example, to allow various functionalities in relation to a property of the push performed on the button; for example, one long push may indicate a "record" instruction, two short pushes may indicate a "stop" instruction, one short push may indicate a "pause" instruction, or the like.

In some embodiments, in addition to or instead of user interface 224, recorder 200 may optionally include a one-button interface 226, which may include, for example, a push-button or a switch allowing a user to input a plurality of instructions. For example, a set of three short pushes of one-button interface 226 may indicate a "record" instruction, and a subsequent set of three short pushes of one-button interface 226 may indicate a "stop" instruction or a "pause" instruction.

In some embodiments, only one and not both of the user interface 224 and/or the one-button interface 226 and/or the remote control 218 may be operational at a certain time. For example, in one embodiment, recorder 200 may detect that a wired remote control 218 is connected to recorder 200 through link 217, may accept and perform instructions provided through remote control 218, and may ignore instructions provided by user interface 224 and/or one-button interface 226 while remote control 218 is connected to recorder 200.

In some embodiments, recorder 200 and/or remote control 218 may include one or more vibration units 280, e.g., one or more motors, able to vibrate or produce a one or more vibrations in accordance with a pre-defined pattern. The vibrations may be produced, for example, in relation to a received instruction or command, when a pre-defined condition is met, or in relation to an operational status or an operational property of recorder 200. For example, in one embodiment, recorder 200 and/or remote control 218 may vibrate upon receiving of an instruction or command by recorder 200, recorder 200 may vibrate for two seconds when recorder 200 stops recording A/V data, or recorder 200 may vibrate for one second when recorder 200 enters into a "pause" state. In an alternate embodiment, recorder 200 and/or remote control 218 may vibrate upon receiving an alarm signal through alarm port 215. In some embodiments, recorder 200 and/or remote 218 may be configured to temporarily avoid vibrating, e.g., upon an instruction from the user and for a pre-defined period of time, or until the vibration feature is turned on, or while a wired remote control 218 is connected to recorder 200.

In some embodiments, one or more components of recorder 200 may operate in accordance with a predetermined synchronization scheme, e.g., a predetermined timing or frequency scheme, for example, to allow smooth and/or real-time compression or recording of A/V data. For example, if the received A/V data includes data representing 30 frames per second, then recorder 200 may process and record the A/V data at 30 frames per second. For example, in some exemplary embodiments, video A/D converter 203 may convert 30 frames per second, encoder 204 may encode 30 frames per second, and processor 204 may write 30 frames per second into storage unit 209. In some embodiments, one or more optional timing components may be used to achieve such synchronization, for example, a clock, a timer, one or more buffers or delay units, PLL 213, or other suitable components.

In some embodiments, recorder 200 may optionally include one or more modifier buttons 225, for modifying one or more properties of the operation of recorder 200. In one embodiment, for example, modifier button 225 may modify the encoding bit-rate used by encoder 204, e.g., from 128 kilobit per second to 64 kilobit per second. In one embodiment, for example, modifier button 225 may modify the compression ratio or the quality of the encoded A/V data, e.g., to allow 2 hours, 4 hours, 6 hours or 8 hours of recording. In one embodiment, for example, modifier button 225 may modify a Frames Per Second (FPS) parameter used by encoder 204 and/or processor 206 and/or recorder 200, e.g., to allow recording of 30 FPS, 25 FPS, 15 FPS, or other suitable values. In some embodiments, for example, modifier button 225 may be used to instruct recorder 200 to record only video data, to record only audio data, or to record both audio and video data.

In some embodiments, recorder 200 may optionally include one or more Light Emitting Diodes (LEDs) 231 or any other visible indications, which may indicate a property of recorder 200 or its operation. For example, in some embodiments, LED 231 may be associated with on/off switch 222 and/or with battery 229, such that LED 231 may illuminate when recorder 200 is turned on or is recording or is ready to record, and such that LED 231 may not illuminate when recorder 200 is turned off. In an alternate embodiment, for example, illumination of LED 231 may indicate that recorder 200 is recording, or that recorder 200 is in "pause" mode and not recording. In another embodiment, a multi-color LED 231 may indicate a property of recorder 200, for example, a bit-rate used by encoder 204.

In some embodiments, for example, a multi-color LED 231 may indicate a ratio between an available storage capacity of storage unit 209 and a maximum storage capacity of storage unit 209; for example, in one embodiment, multicolor LED 231 may illuminate in green when the ratio is between 76 to 100 percent, may illuminate in white when the ratio is between 51 and 75, may illuminate in yellow when the ratio is between 26 and 50, and may illuminate in red when the ratio is 25 percent or less.

In some embodiments, for example, a multi-color LED 231 may indicate a ratio between an available power of battery 229 and a maximum power of battery 229; for example, in one embodiment, multi-color LED 231 may illuminate in green when the ratio is between 76 to 100 percent, may illuminate in white when the ratio is between 51 and 75, may illuminate in yellow when the ratio is between 26 and 50, and may illuminate in red when the ratio is 25 percent or less.

In some embodiments, recorder 200 may optionally include a delete button 223, to allow deletion of some or all of the A/V data stored in storage unit 209. In one embodiment, delete button 223 may include, for example, a push-button which may be relatively less easily operated, e.g., a one-millimeter delete button 223 sunk within recorder 200 and accessible using a pen or a pin or a needle, or a delete button 223 which may be operational only after being pressed for at least four seconds. In one embodiment, upon pressing delete button 223, substantially the entire A/V data stored in storage unit 209 may be deleted. In an alternate embodiment, upon pressing delete button 223, the least recent A/V data file stored in storage unit 209 may be deleted.

In some embodiments, recorder 200 may optionally include a detector 214, which may be operationally associated with encoder 204 and/or A/V input port 201. Detector 214 may include, for example, a controller able to detect whether A/V input port 201 is receiving video signals, whether A/V input port 201 is receiving audio signals, or whether A/V input port 201 is receiving both audio and video signals. Detector 214 and/or encoder 204 may perform operations or avoid performing operations in relation to the detection results. For example, in one embodiment, encoder 204 may avoid encoding A/V data if detector 214 detects that A/V input port 201 is not receiving A/V signals, or if detector 214 detects that A/V input port 201 is not receiving a video signal. In an alternate embodiment, for example, recorder 200 may generate a vibration using vibration unit 280, e.g., if detector 214 detects that A/V input port 201 is not receiving A/V signals, or if detector 214 detects that A/V input port 201 is not receiving a video signal. In some embodiments, for example, recorder 200 may operate in a "standby" mode, e.g., encoder 204 may encode A/V data, and/or processor 206 may store data into storage unit 209, only if detector 214 detects that A/V data is received by input port 201.

In some embodiments, recorder 200 may optionally include a display unit 232, which may include, for example, a Liquid Crystal Display (LCD), e.g., a color LCD, a monochrome LCD, a grayscale LCD, or the like. Display unit 232 may, for example, display one or more indications related to recorder 200 or its operation. For example, in some embodiments, display unit 232 may display an indication of a current mode of operation of recorder 200, e.g., a "record" mode, a "pause" mode, or a "stop" mode. In one embodiment, for example, display unit 232 may display an indication of a ratio between an available storage capacity of storage unit 209 and a maximum storage capacity of storage unit 209. In another embodiment, for example, display unit 232 may display an indication of a ratio between an available power of battery 229 and a maximum power of battery 229. In an alternate embodiment, for example, display unit 232 may display an indication of the encoding bit-rate used by encoder 204, of a compression ratio or a compression algorithm used by encoder 204, or the like.

In some embodiments, recorder 200 may optionally include a decoder 233, which may include, for example, a processor able to decode or decompress digital A/V data in accordance with a pre-defined protocol or algorithm. For example, decoder 233 may be connected to storage unit 209, may read a compressed MPEG-2 file stored in storage unit 209, and may decode the file to produce substantially uncompressed digital video data and/or audio data. In some embodiments, the uncompressed digital video data may optionally be converted from a digital format to an analog format, e.g., using a Digital to Analog (D/A) converter 286. In one embodiment, the uncompressed video data may be transferred to display unit 232, and the uncompressed audio data may be transferred to an optional speaker 285. In an alternate embodiment, the uncompressed A/V data may be transferred out of recorder 200, e.g., using an A/V output port 234, to an external display unit, playback unit, monitor, television, speaker, earphones, or other external devices.

In some embodiments, optionally, speaker 285 may produce audible indications in relation, for example, to a property of recorder 200 or to the operation of recorder 285. For example, speaker 285 may provide an audible indication when battery 229 has a pre-defined threshold value of available power, when storage unit 209 has a pre-defined threshold value of available storage capacity, when recorder 200 receives an instruction from a user through user interface 224 or remote control 218, or when pre-defined conditions or criteria are met. In one embodiment, speaker 285 may be turned off or turned on, for example, using user interface 224 or remote control 218, to allow a user to operate recorder 200 in a "silent mode" in which substantially no audible indications are generated.

In some embodiments, recorder 200 may have a relatively small size, or may be relatively lightweight. In some embodiments, for example, recorder 200 may have a weight or mass of approximately 80 grams or 2.8 ounces not including battery 229, a weight or mass of approximately 114 grams or 4 ounces including battery 229, a weight or mass of under 120 grams or 4.5 ounces or not more than 115 grams including battery 229, or a weight or mass of under 100 grams or 3 ounces not including battery 229. In some embodiments, recorder 200 may be easily concealable, e.g., under a shirt, under a pair of paints, inside an underwear garment, behind a wall-mounted painting, inside a drawer, under a bed, under a table, inside an internal or external pocket of a clothing article, or the like. For example, in some embodiments, recorder 200 may have a length of approximately 77 millimeters, a width of approximately 50.8 millimeters, and a depth of approximately 23 millimeters. In some embodiments, for example, recorder 200 may have a volume of approximately 90 cubic centimeters, a volume of approximately 3.05 fluid ounces, a volume smaller than 90 or 100 cubic centimeters, or a volume smaller than 3.0 or 3.3 fluid ounces.

In some embodiments, optionally, A/V input port 201 may include one or more composite video input sockets or interfaces, e.g., supporting PAL, SECAM and/or NTSC standards.

In some embodiments, A/V input port 201 may include one MIC audio input and one Line-In audio input, which may optionally be used as dual mono inputs.

In some embodiments, A/V output port 234 may include one or more composite video output sockets or interfaces. In one embodiments, recorder 200 may switch, e.g., based on a user's command, between outputting recorded playback through A/V output port 234, and outputting "live" or substantially real-time A/V captured by recorder 200 (e.g., as a "live" monitor).

In some embodiments, recorder 200 may record A/V in a time-lapse mode or in interval mode. For example, recorder 200 may record one or more frames every pre-defined number of seconds, for example, one frame every two seconds, one frame every fifty seconds, one frame every two minutes, or the like.

In some embodiments, optionally, recorder 200 may output data and record to a secondary attached storage unit, e.g., a secondary USB-attached miniature disk drive.

In some embodiments, media files stored by recorder 200 may optionally include a signature or encoding, e.g., to authenticate the files and/or to avoid tampering with the files.

In one embodiment, media files may be encrypted using a user-generated key or password.

In some embodiments, recorder 200 may add a visible time-stamp, a visible date-stamp, or other visible on-screen stamps to video frames prior to their encoding and/or storage, e.g., at a pre-defined location of the frames or at a user-selected location of the frames.

In some embodiments, recorder 200 may optionally include a motion detector or other sensor, e.g., such that recorder 200 may begin or continue to record A/V upon detection of motion, and may stop or pause recording of A/V when motion is no longer detected.

In some embodiments, recorder 200 may optionally serve as a mass-storage device, e.g., when connected to a Personal Computer through the USB port 210. Optionally, recorder 200 may further serve as a host to one or more slave storage devices.

In some embodiments, one or more software components and/or firmware components of recorder 200 may be upgrade-able or modifiable, e.g., utilizing the USB port 210 and a software running on a Personal Computer.

In one embodiment, recorder 200 may have a length of approximately or under 92 millimeters, a width of approximately or under 62 millimeters, and a height of approximately or under 27 millimeters.

Figure 23:
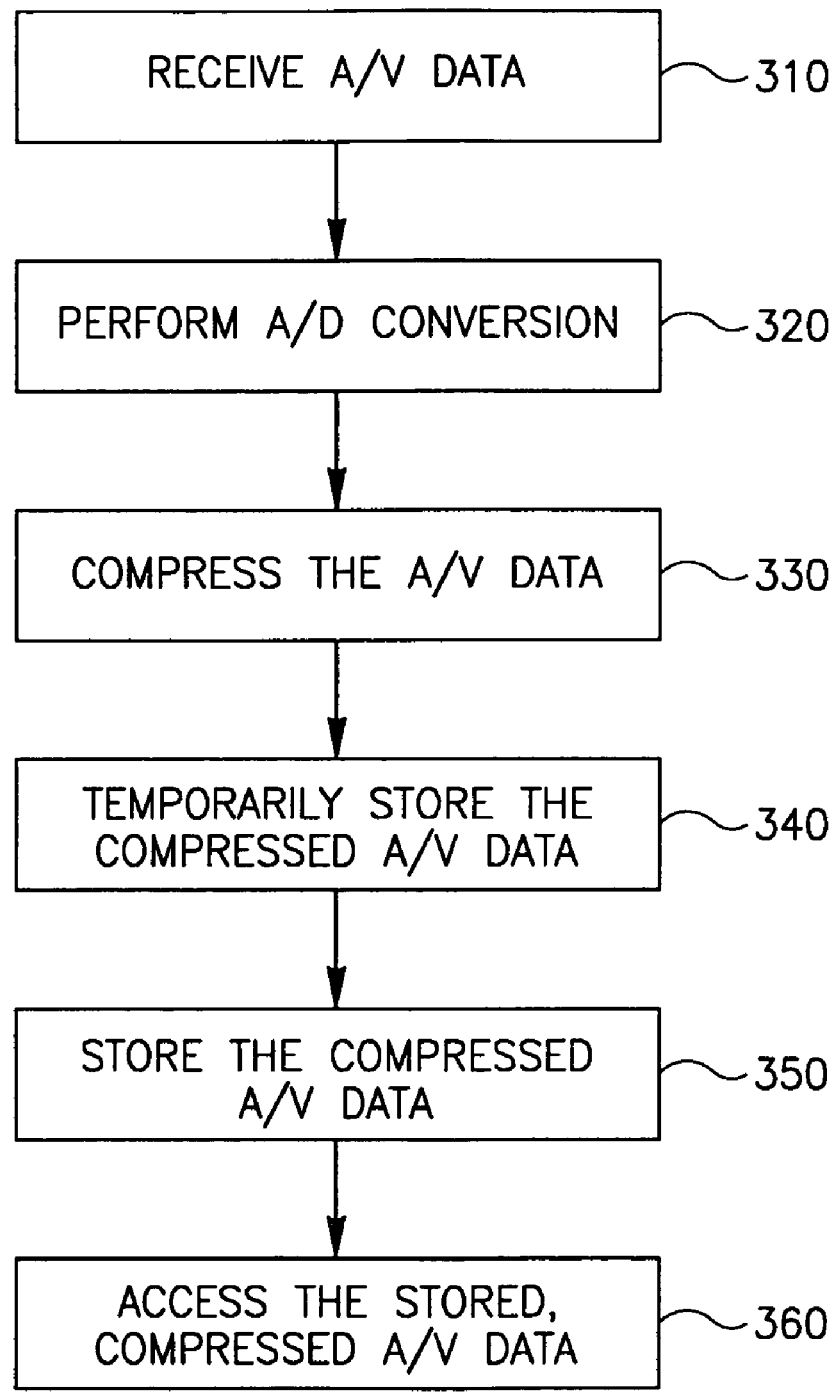
FIG. 23 is a schematic flow-chart of a method of A/V data recording in accordance with an embodiment of the invention.

Reference is now made to FIG. 23, which is a schematic flow-chart of a method of A/V data recording in accordance with some embodiments of the invention. The method may be used, for example, by recorder 200, by recorder 110, or by other suitable devices or systems.

As indicated at block 310, the method may include receiving a signal carrying A/V data. This may be performed, for example, by A/V input port 201.

As indicated at block 320, the method may optionally include converting the received A/V data from an analog format to a digital format. This may be performed, for example, by A/D converters 202 and 203.

As indicated at block 330, the method may include compressing the A/V data in accordance with an encoding standard or a compression algorithm. This may be performed, for example, by encoder 204 and in accordance with MPEG-2 encoding.

As indicated at block 340, optionally, the method may include temporarily storing the compressed A/V data, for example, in FIFO buffer 205. This may be performed, for example, by encoder 204.

As indicated at block 350, the method may include storing the compressed A/V data storage unit, e.g., storage unit 209. This may be performed, for example, by processor 206, in discrete portions, and in accordance with a pre-determined file format or structure.

As indicated at block 360, the method may include accessing the stored, compressed A/V data. This may be performed, for example, by computer 130 which may be connected to recorder 200 through link 131 and USB port. The accessing may include, for example, reading A/V data stored in storage unit 209, modifying A/V data stored in storage unit 209, or deleting A/V data stored in storage unit 209. In an alternate embodiment, the accessing may be performed, for example, using a monitor or a television which may be connected to A/V output port 234 and may display the A/V data stored in storage unit 209.

Other suitable operations or sets of operations may be used in accordance with embodiments of the invention.

Figure 24:
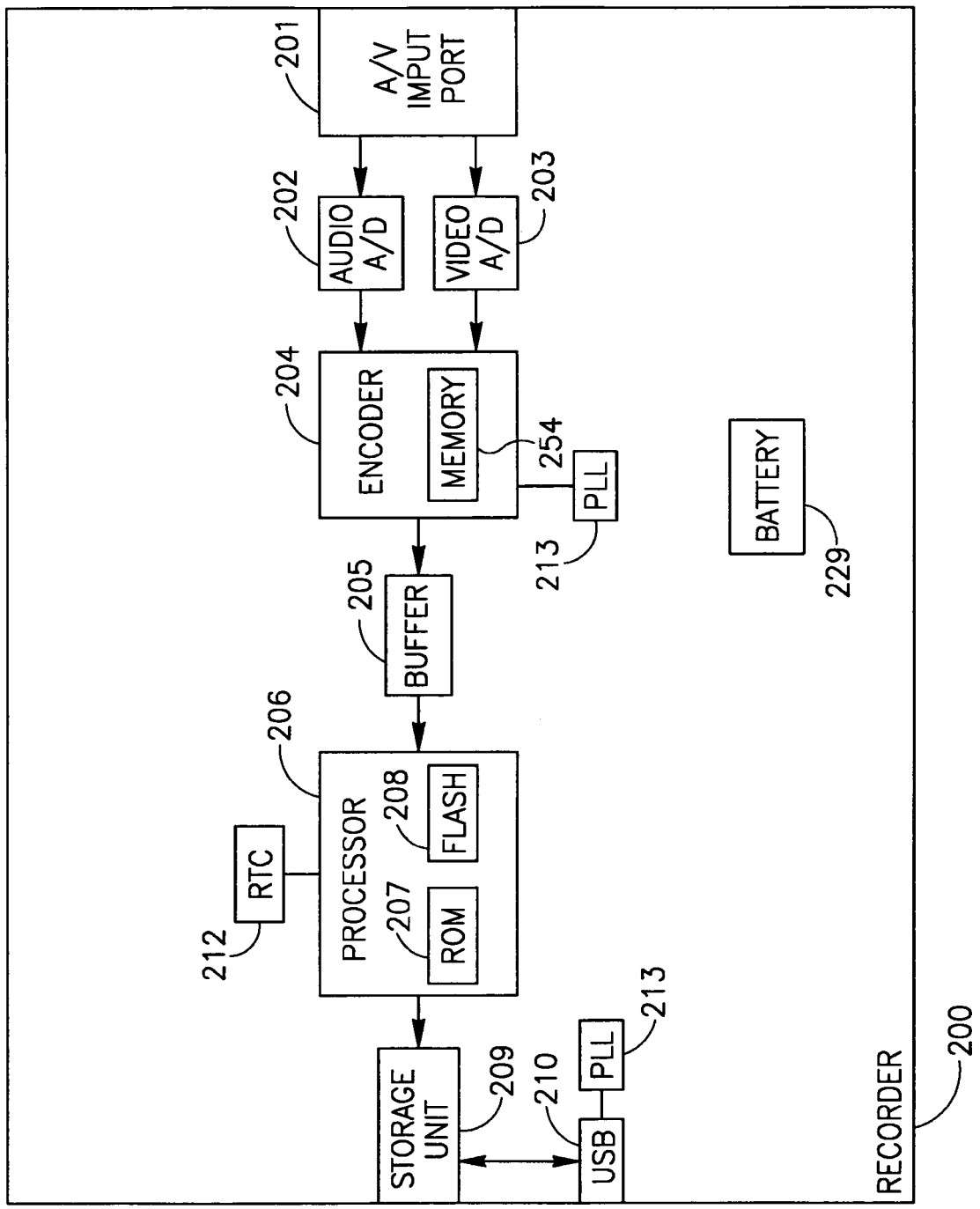
FIG. 24 is a schematic illustration of a block diagram of a digital A/V data recorder in accordance with another embodiment of the invention.

FIG. 24 schematically illustrates a block diagram of a digital data recorder 400 in accordance with another exemplary embodiment of the invention. Recorder 400 may be an example of recorder 110 of FIG. 21. Recorder 400 may be suitable for compression and recording of digital A/V data in accordance with some embodiments of the invention, and may not include some of the optional components shown in FIG. 22.

In some embodiments, recorder 400 may include, for example, A/V input port 201, audio A/D converter 202, video A/D converter 203, encoder 204 having memory unit 254, buffer 205, processor 206 having ROM 207 and Flash memory 208, storage unit 209, USB port 210, RTC 212, and one or more PLLs 213. Recorder 400 may optionally include one-button interface 226 or another suitable user interface.

The operation of recorder 400 and its components may be similar or substantially identical to the operation of recorder 200 and its corresponding components, as detailed with reference to FIG. 22.

Figure 25A:
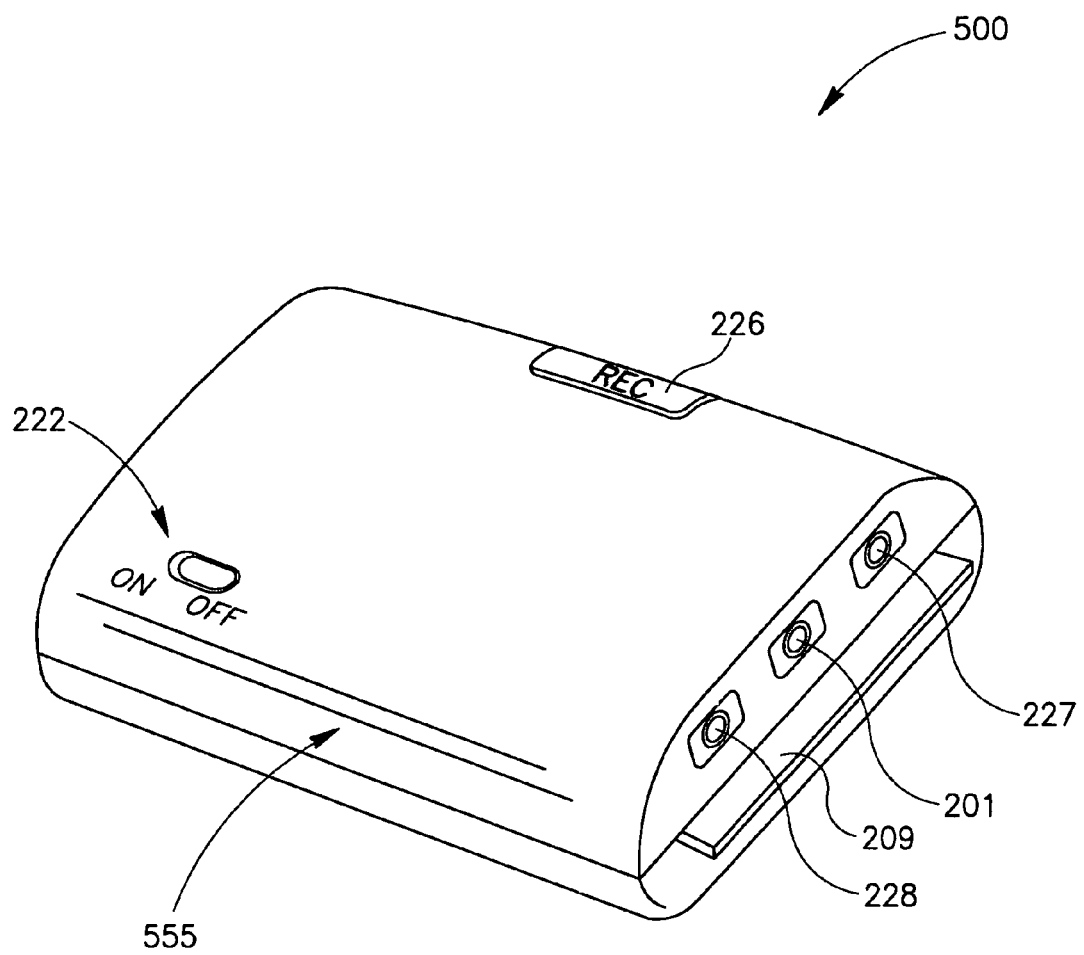
FIGS. 25A-25B are illustrations of a first side-view and a second side-view, respectively, of a digital data recorder in accordance with an embodiment of the invention.
Figure 25B:
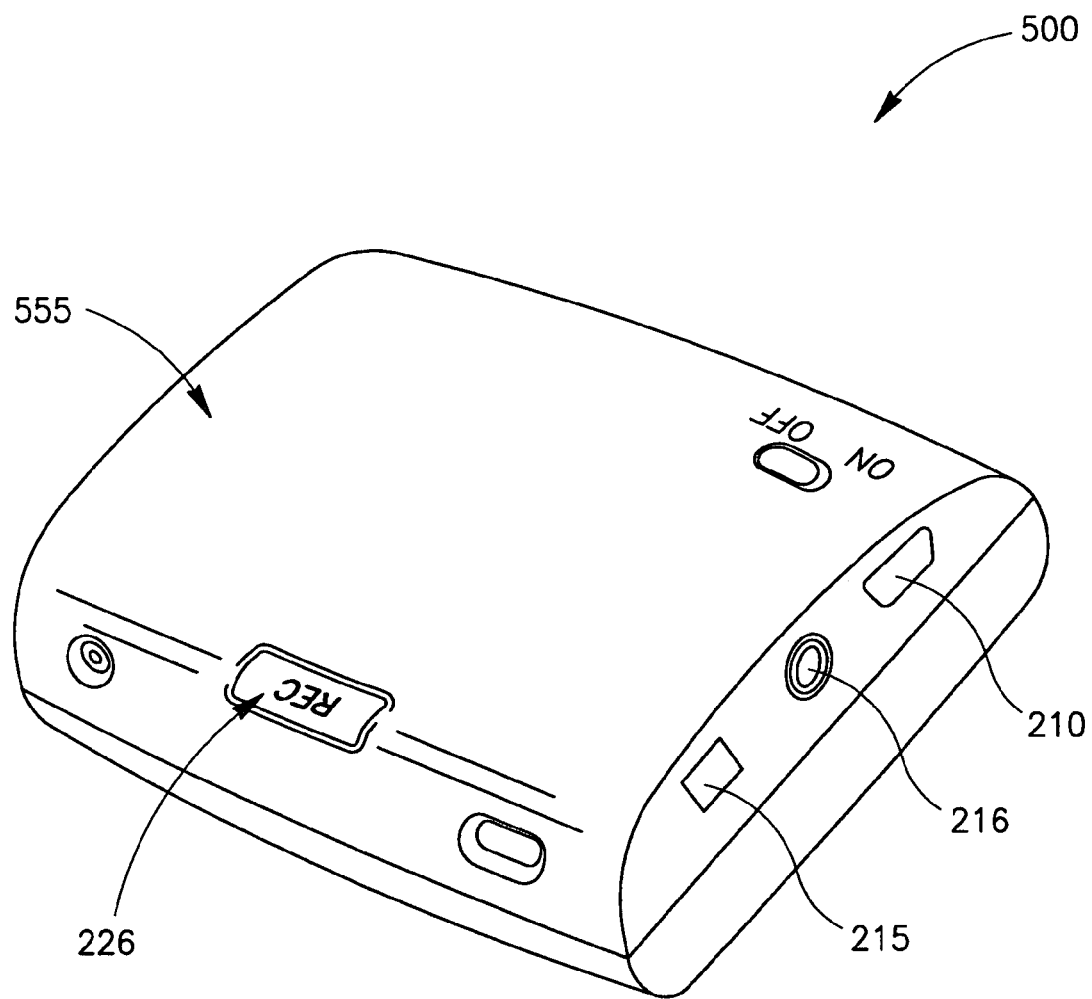

FIGS. 25A-25B illustrate a first side-view and a second side-view, respectively, of a digital data recorder 500 in accordance with an exemplary embodiment of the invention. Recorder 500 may be similar, for example, to recorder 110, recorder 200, or recorder 400. In some embodiments, some or all of the components of recorder 500 may be placed inside a housing 555, e.g., a stand-alone box or packaging made from plastic or other suitable materials.

Figure 26:
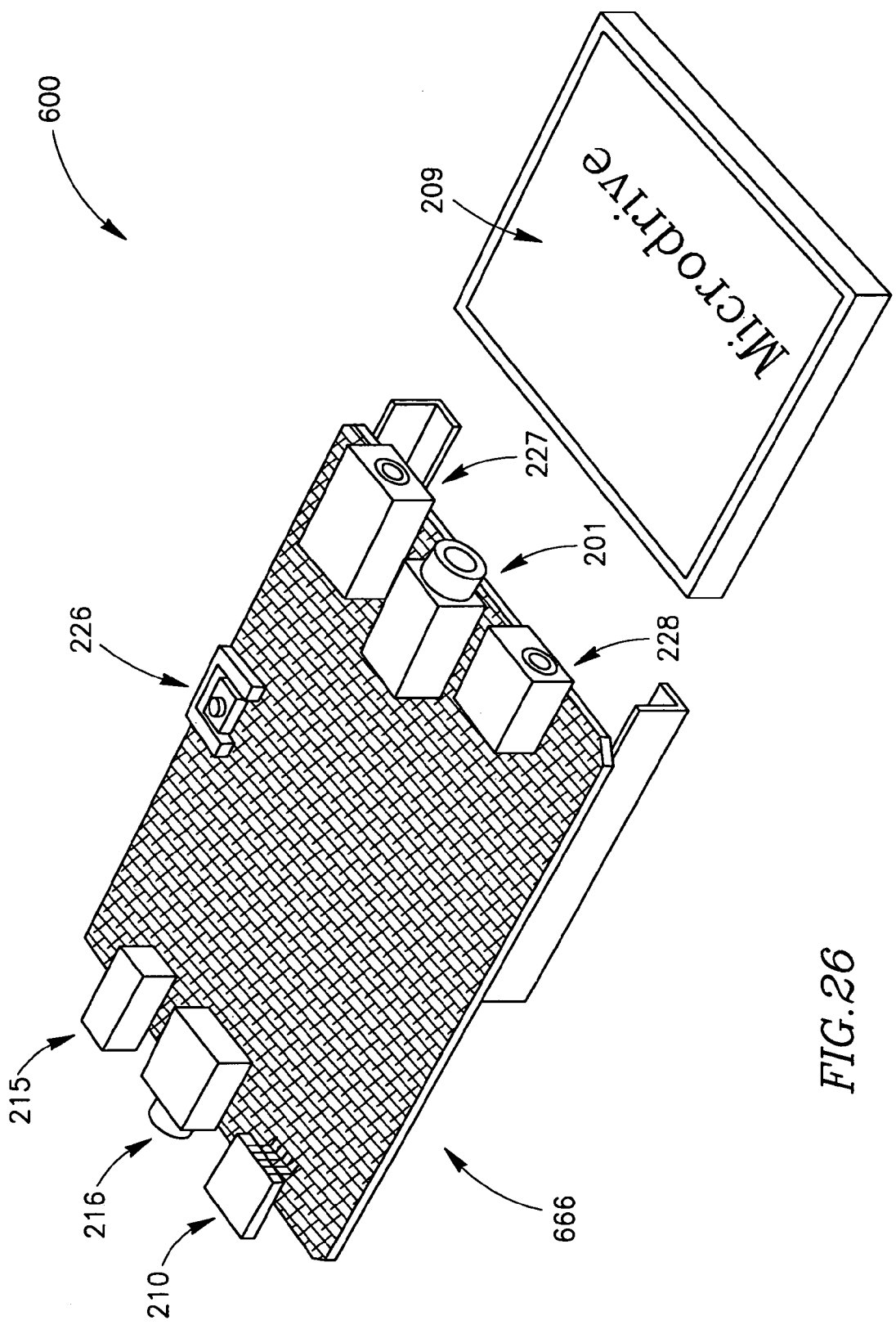
FIG. 26 is an illustration of a digital data recorder in accordance with another embodiment of the invention.

FIG. 26 illustrates a digital data recorder 600 in accordance with an exemplary embodiment of the invention. Recorder 600 may be similar, for example, to recorder 110, recorder 200, recorder 400 or recorder 500. Recorder 600 may be implemented, for example, using a processing circuit 666 which may include an Integrated Circuit (IC) or a processing board having one or more of the components of recorder 600.

Figure 27:
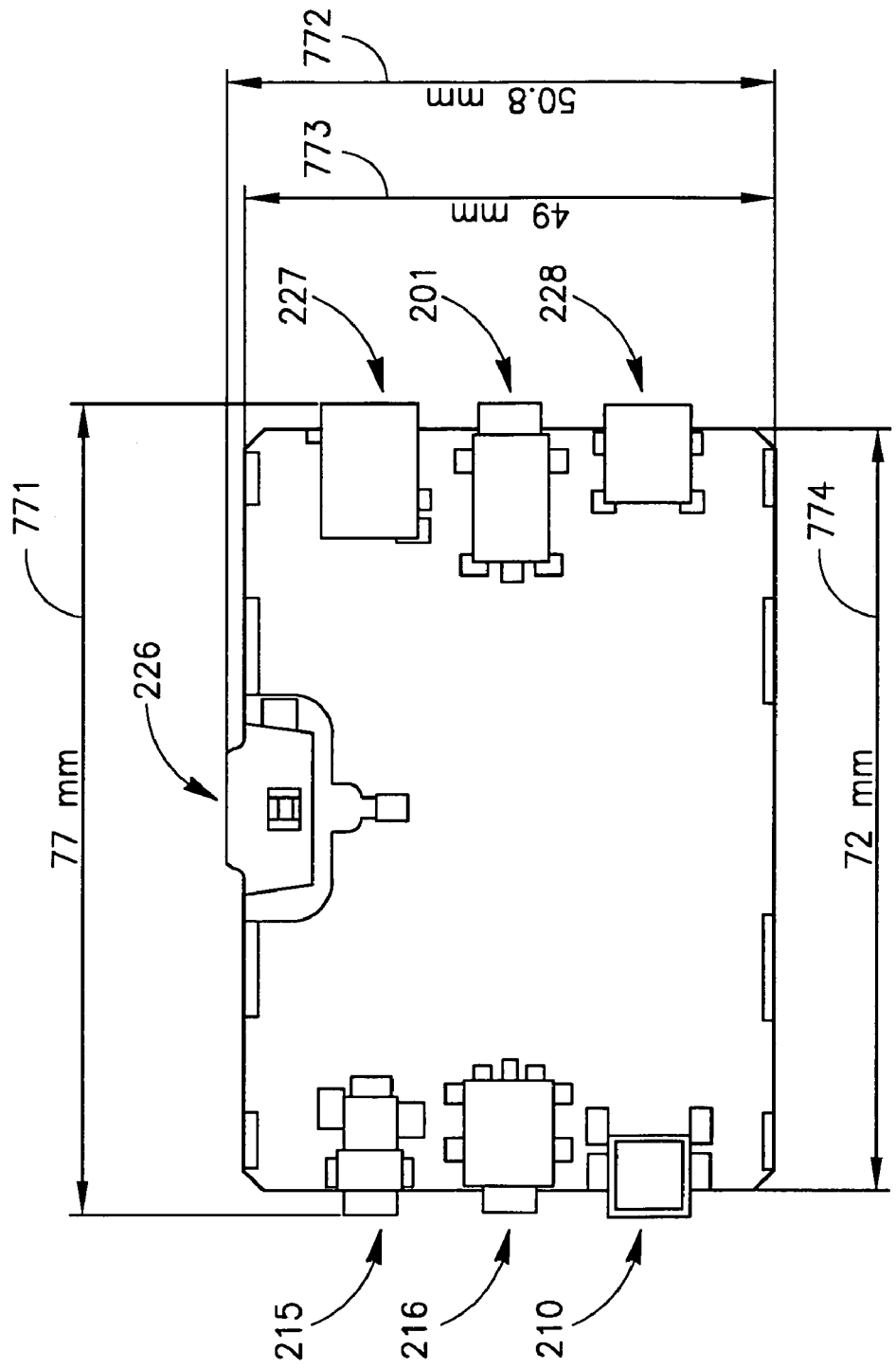
FIG. 27 is an illustration of a digital data recorder in accordance with another embodiment of the invention.

FIG. 27 schematically illustrates a digital data recorder 700 may be similar, for example, to recorder 110, recorder 200, recorder 400, recorder 500 or recorder 600. Arrows 771, 772, 773 and 774 indicate the sizes in millimeters of corresponding portions of recorder 700.

It will be appreciated that some embodiments of the invention may include, for example, a suitable combination of components of system 100 and/or recorder 200, which may be implemented using a single unit or inside a single housing. For example, a digital data recorder in accordance with one embodiment may include a housing or a package similar to housing 555 of FIG. 25A, including camera 120 of FIG. 21 and recorder 200 of FIG. 22. In an alternate embodiment, a digital data recorder may include, for example, a housing or a package similar to housing 555 of FIG. 25A, including camera 120 of FIG. 21 and recorder 400 of FIG. 24. Other suitable components or units may be combined, embedded or integrated within a common housing, package, board or circuit in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A mounting device for mounting equipment onto a helmet, the mounting device comprising:
   a support structure having one or more gripping mechanisms adapted to be fitted to one or more locations of the helmet, said gripping mechanism comprising an adjustable-length rail to adjust the length of said gripping mechanism, and one or more removable linking elements to adjust the length or curvature of said support structure; and
   a camera mount, at a first location of the support structure, to support a camera at a desired image-capturing position.

2. The mounting device of claim 1, further comprising:
   a recorder mount, at a second location of the support structure, to support a recorder operatively associated with the camera.

3. The mounting device of claim 2, further comprising:
   a wired link to transfer to the recorder data captured by the camera.

4. The mounting device of claim 3, further comprising:
   a first grip to connect the mounting device to a first side of the helmet.

5. The mounting device of claim 4, wherein the first grip comprises:
   a hook adapted to grip an edge of the helmet.

6. The mounting device of claim 4, wherein the first grip comprises:
   a hook adapted to grip a foam layer of the helmet.

7. The mounting device of claim 4, wherein the first grip comprises:
   a locking mechanism to modify a length of a rail that protrudes from a housing, the rail able to connect to a side of the helmet.

8. The mounting device of claim 7, wherein the locking mechanism comprises:
   a screwing mechanism able to lock the rail at a desired protrusion length.

9. The mounting device of claim 4, further comprising:
   a second grip to connect the mounting device to a second, substantially opposite, side of the helmet.

10. A system for capturing video, the system comprising:
    a camera mount to support a camera;
    a recorder mount to support a recorder operatively associated with the camera;
    one or more linking elements to attach the camera mount to the recorder mount;
    a wired link to transfer to the recorder data captured by the camera;
    one or more grips adapted to connect the system to a helmet,
    wherein the one or more linking elements form a chain, and wherein at least one of the one or more linking elements is removable.

11. The system of claim 10, wherein the camera mount is connected to an orientation mechanism able to modify an orientation of the camera.

12. The system of claim 10, wherein the camera mount is able to slide on a base rail of an orientation mechanism upon application of force.

13. The system of claim 10, wherein the camera mount comprises:
    a housing to protect the camera from mechanical shocks; and
    an opening through which a lens of the camera acquires data.

14. The system of claim 10, wherein at least one of the one or more linking elements comprises a hollow shaft traversing therethrough.

15. The system of claim 14, wherein at least part of the wired link passes through the hollow shaft.

16. The system of claim 15, further comprising:
    a cable to transfer power from a power source of the system to the camera,
    wherein at least part of the cable passes through the hollow shaft.

17. The system of claim 10, wherein the one or more grips comprise:
    a rail having a single-directional length-shortening mechanism to shorten the length of the rail, the rail having a hook adapted to grip an edge of the helmet.

18. The system of claim 10, wherein a lower side of at least one of the camera mount, the recorder mount and the one or more linking element is substantially curve-shaped to fit a curve-shape of the helmet.

19. The system of claim 10, further comprising:
    the camera supported by the camera mount; and
    the recorder supported by the recorder support,
    wherein the recorder includes a digital storage unit to record the data captured by the camera.

* * * * *